United States Patent [19]

Winterbottom

[11] Patent Number: 5,465,365
[45] Date of Patent: Nov. 7, 1995

[54] APPARATUS AND METHODS FOR MAKING A PORTION OF A FIRST NAME SPACE AVAILABLE AS A PORTION OF A SECOND NAME SPACE

[75] Inventor: Philip S. Winterbottom, Gillette, N.J.

[73] Assignee: AT&T Corp., Murray Hill, N.J.

[21] Appl. No.: 247,626

[22] Filed: May 20, 1994

Related U.S. Application Data

[63] Continuation of Ser. No. 999,755, Dec. 31, 1992, abandoned.

[51] Int. Cl.$^6$ .............................. G06F 12/00; G06F 13/00
[52] U.S. Cl. .................... 395/600; 395/700; 364/DIG. 1; 364/253; 364/239.9; 364/284; 364/419.19
[58] Field of Search ................................... 395/700, 425, 395/400, 600

[56] References Cited

U.S. PATENT DOCUMENTS 4,853,843  8/1989  Ecklund .............................. 364/DIG. 1
5,014,192  5/1991  Mansfield et al. ................... 364/DIG. 1

FOREIGN PATENT DOCUMENTS 91110042  12/1991  European Pat. Off. .
91306291   1/1992  European Pat. Off. .
93104967  10/1993  European Pat. Off. .

OTHER PUBLICATIONS

Tannenbaum, et al, "Distributed Operating Systems", Computing Surveys, vol. 17, No. 4, Dec. 1985.
Mullender, et al., "Amoeba—A Distributed Operating System for the 1990s", IEEE Comp. Magazine, May, 1990.
Comer, et al., "An Experimental Implementation of the Tilde Naming System", Comp. Systems, vol. 3, No. 4, Fall 1990, pp. 487–515.
Cabrera et al., "Quick Silver Distributed File Services: An Architecture for Horizontal Growth", CH2441-4/88/0000/0023, IEEE, 1988.
Presotto, et al., "The Organization of Networks in Plan 9", Proceedings of Winter Usenix Conf., San Diego, 1993, pp. 271–280.
R. Pike, et al. "The Use of Name Spaces in Plan 9", Proceedings of the 5th ACM SIGOPS Workshop, Mont. Saint Michel, 1992, paper #34.
H. C. Rao, "Distributed Application Framework for Large Scale Distributed Systems", *The 13th International Conference on Distributed Computing Systems*, 25 May 1993, Pittsburgh, Pa., pp. 31–38.
P. B. Hansen, "A Joyce Implementation", *Software Practice & Experience*, vol. 17, No. 4, Apr. 1987, Chichester GB, pp. 267–276.
A. K. Sanwalka, Z. G. Vranesic, S. G. Zaky and V. C. Hamacher, "An Approach to Internetworking for Existing Operation Systems", *Proceedings of the IEEE Pacific RIM Conference on Communications, Computers and Signal Processing*, 4 Jun. 1987, Victoria, BC, CDN, pp. 55–59.

Primary Examiner—Eddie P. Chan
Attorney, Agent, or Firm—Gordon E. Nelson

[57] ABSTRACT

Apparatus and methods for incorporating a portion (including all) of a first name space into a second name space. An agent operating in the first name space receives first operation specifiers which use names as they are used in the second name space from an entity operating in the first name space and translates the first operation specifiers into second operation specifiers which specify the same operations and use the names as they are used in the first name space. The apparatus and methods are implemented in the Plan 9 operating system. The first and second name spaces are organized as trees and belong to a first process operating on a first processor and a second process operating on a second processor. The first operation specifiers are Plan 9 file protocols which the first process receives from the second process. The second operation specifiers are Plan 9 file system calls made by the first process. The translation between the file protocols and the system calls is made using a data structure which permits the names in the portion as they are used in the second name space to be mapped onto the names as they are used in the first name space.

23 Claims, 11 Drawing Sheets

APPARATUS AND METHODS FOR MAKING A PORTION OF A FIRST NAME SPACE AVAILABLE AS A PORTION OF A SECOND NAME SPACE

This application is a continuation of application Ser. No. 07/999755, filed on Dec. 31, 1992, now abandoned.

CROSS-REFERENCE TO RELATED APPLICATION

The techniques described in this application are implemented in the distributed computing system described in U.S. Ser. No. 07/70265 Pike, et al. *Distributed Computing System*, filed May 17, 1991, now abandoned. FIGS. 1–13 from that application and the portion of the Detailed Description through the section "Obtaining an Open Protocol Channel" have been incorporated into the present application.

BACKGROUND OF THE INVENTION

1. Field of the Invention

The techniques described herein relate generally to name spaces employed in computer systems and more specifically to the incorporation of one name space into another name space.

2. Description of the Prior Art

Many of the entities available to a program executing on a computer system have names, i.e., identifiers which are not addresses but which may nevertheless be used by a program to locate the entity specified by the identifier. The computer system's operating system includes components which permit the user to name entities, which keep track of the relationships between names and entities, and which permit the user to locate the entity by means of its name.

Files are common examples of such named entities. The file system component of the operating system permits the user to give a file a character-string name and to locate the file using the character-string name. Other named entities may be devices such as terminals or printers. The set of names which a program may use to locate entities is termed the name space in which the program executes. The operating system determines how the name space is organized. In some cases, the name space is fiat, that is, all names are on a single level. In other cases, the operating system organizes the names into hierarchies. A common form of hierarchical organization is the single tree. All of the names in the name space are organized into a tree with a single root. Names at interior nodes of the tree represent directories; names at leaf nodes represent ordinary entities. To locate an entity or directory in such a tree, a program specifies the name of the entity or directory and the names of all of the directories between the root of the tree and the entity or directory or the name of the entity or directory and the names of all of the directories between the process's current directory and the entity or directory. The combination of names necessary to locate the entity is termed the entity's path name.

In the past, name spaces have generally been per-system. Any program operating on a system could locate any named entity in the system. An example of such a per-system name space is that provided by a computer running the wellknown UNIX™ operating system. All of the files provided by the UNIX operating system are organized into a single tree, and a program may locate any file in the system by specifying the file's path name in the tree. An advantage of this form of organization was that entities used by all programs, such as the executable code for the operating system or other utilities, could be made available to all programs by putting them in at predetermined places in the name space. Indeed, if two systems shared the same naming conventions for those predetermined places, a program which executed on one UNIX system would execute on another. For example, in UNIX systems, commonly-used utility programs are generally kept in the directory which is accessible by the path name/bin.

Originally, computer systems were independent entities. They could be connected by communications media, but the connected systems did not form a single system. As communications media have improved and the price of processors and memory have dropped, distributed computer systems have arisen. In these systems, a set of processors, display devices, and file storage devices which are connected by communications media form a single system. An advantage of a distributed system is that there is no logical limit to system size. While current distributed systems typically consist of a set of work stations which are connected via a local area network to each other and to a file server, i.e., a file storage device with a processor which is specialized to perform file operations, there is no reason why every work station, processor, file storage device, display device, and printer in a large corporation could not be part of a single distributed system.

One problem in the design of distributed systems is how to define the name space. In the distributed computing system described in the Pike et al. patent application cited above, name spaces are defined by processes. A process may have its own name space or share a name space with another process, and a process may modify its name space by rearranging the relationships between names in the name space and by adding file trees provided by services to the name space. A difficulty with the definition of name spaces in the computing system of the Pike et al. patent application was that a first process could not incorporate a portion of a second process's name space into its own name space. As a result, operations such as incorporating the name space of a process executing on a work station into the name space of a process executing on a CPU for the user of the work station were exceedingly cumbersome. This problem is overcome by the techniques disclosed herein, which may be used generally to incorporate a portion of one name space into another name space.

SUMMARY OF THE INVENTION

Among the techniques is apparatus operating in a first name space for exporting a portion of the first name space to a second name space. The apparatus includes:

means for receiving a first operation specification which specifies an operation using a name in the portion as the name is used in the second name space;

interpretation means for responding to the first operation specification by producing a second operation specification which specifies the same operation and uses the name as the name is used in the first name space; and means responsive to the second operation specification for performing the operation.

The foregoing and other objects and advantages of the invention will be apparent to one of ordinary skill in the art who peruses the following Drawing and Detailed Description, wherein:

Figure 1:
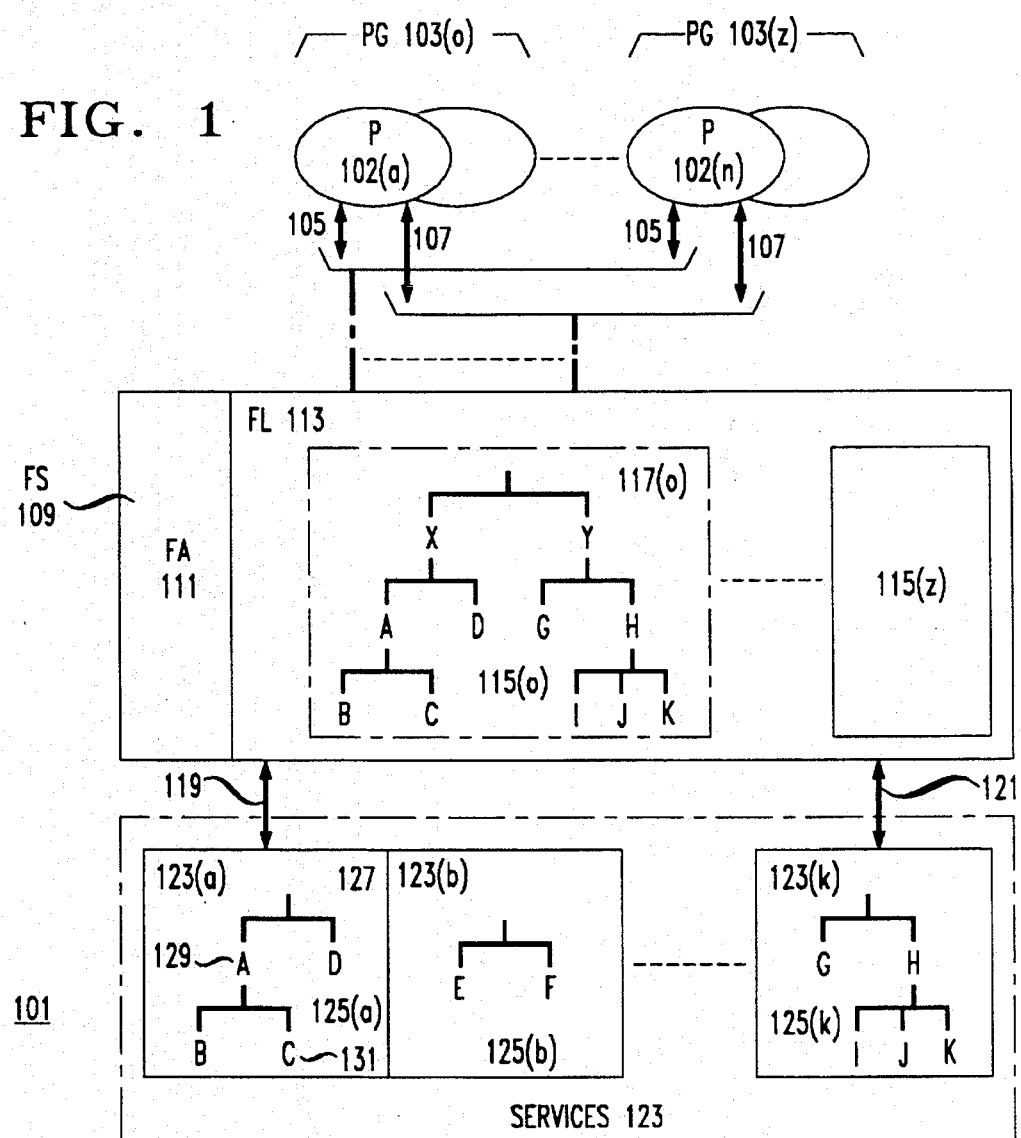
FIG. 1 is an overview of the per-process name spaces provided by the operating system described herein.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Derailed Description of a preferred embodiment begins with an overview of the Plan 9 operating system in which the invention is embodied and a description of the manner in which Plan 9 creates a name space for a process. Thereupon, the techniques by means of which one process may export a name space to another process are described in detail, and finally, two Plan 9 services which employ the techniques are described. Material not taken from the Pike et al. patent application begins with the section "Overview of Export Files Service or exportfs" and FIG. 14 of the drawings.

Figure 7:
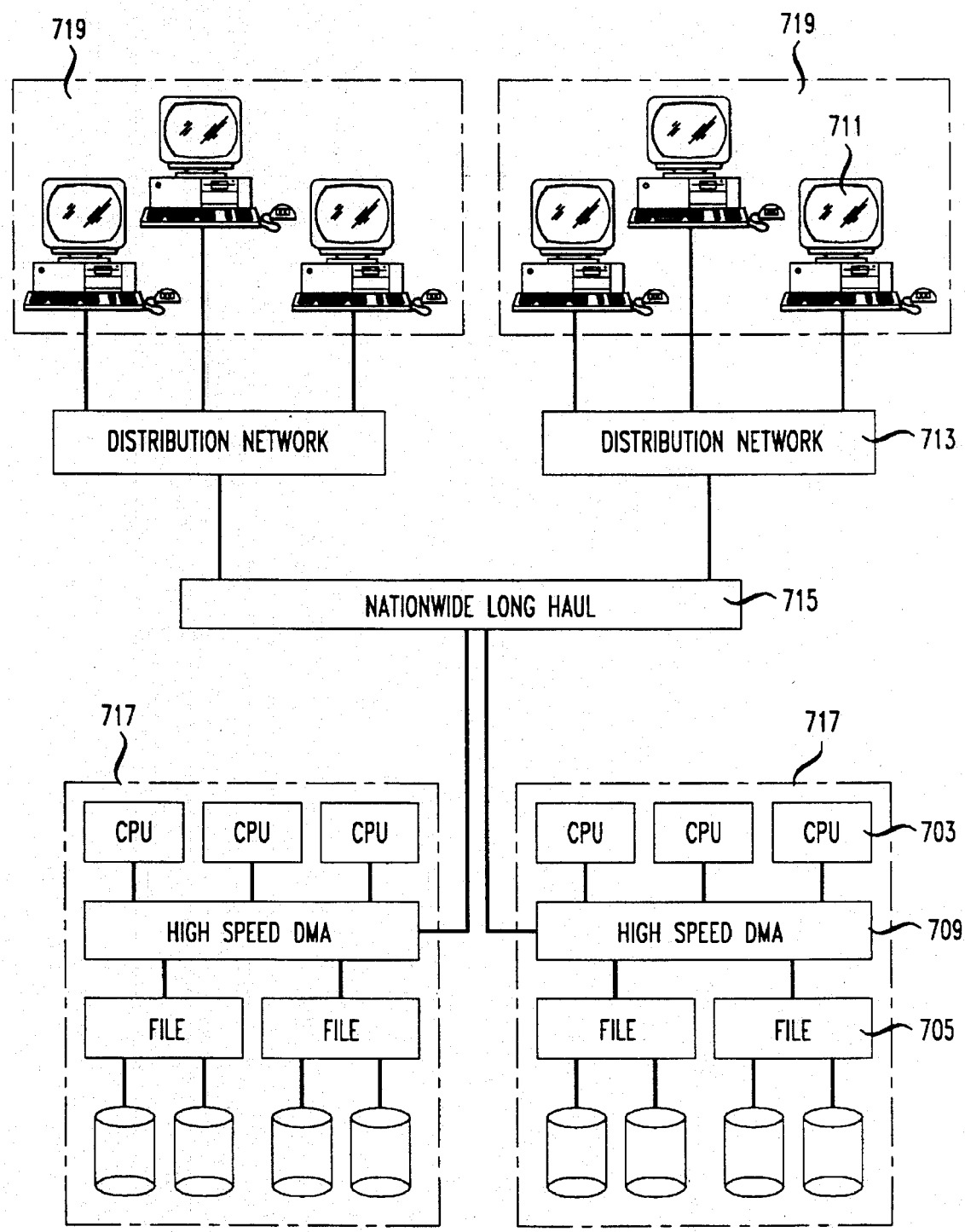
FIG. 7 is a diagram of the distributed system in which the operating system of the present invention is implemented.

Overview of the Plan 9 Operating System: FIG. 7

Plan 9 is a general-purpose, multi-user, portable distributed system implemented on a variety of computers and networks.

Plan 9 is divided along lines of service function. CPU servers concentrate computing power into large (not overloaded) multiprocessors; file servers provide repositories for storage; and terminals give each user of the system a dedicated computer with bitmap screen and mouse on which to run a window system. The sharing of computing and file storage services provides a sense of community for a group of programmers, amortizes costs, and centralizes and hence simplifies management and administration.

The pieces communicate by a single protocol, built above a reliable data transport layer offered by an appropriate network, that defines each service as a rooted tree of files. Even for services not usually considered as files, the unified design permits some noteworthy and profitable simplification. Each process has a local file name space that contains attachments to all services the process is using and thereby to the files in those services. One of the most important jobs of a terminal is to support its user's customized view of the entire system as represented by the services visible in the name space.

To be used effectively, the system requires a CPU server, a file server, and a terminal; it is intended to provide service at the level of a departmental computer center or larger. The CPU server and file server are large machines best housed in an air conditioned machine room with conditioned power.

The following sections describe the basic components of Plan 9, explain the name space and how it is used, and offer some examples of unusual services that illustrate how the ideas of Plan 9 can be applied to a variety of problems.

CPU Servers

Several computers provide CPU service for Plan 9. The production CPU server is a Silicon Graphics Power Series machine with four 25 MHz MIPS processors, 128 megabytes of memory, no disk, and a 20 megabyte-per-second back-to-back DMA connection to the file server. It also has Datakit and Ethernet controllers to connect to terminals and non-Plan 9 systems. The operating system provides a conventional view of processes, based on fork and exec system calls, and of files, mostly determined by the remote file server. Once a connection to the CPU server is established, the user may begin typing commands to a command interpreter in a conventional-looking environment.

A multiprocessor CPU server has several advantages. The most important is its ability to absorb load. If the machine is not saturated (which can be economically feasible for a multiprocessor) there is usually a free processor ready to run a new process. This is similar to the notion of free disk blocks in which to store new files on a file system. The comparison extends farther: just as one might buy a new disk when a file system gets full, one may add processors to a multiprocessor when the system gets busy, without needing to replace or duplicate the entire system. Of course, one may also add new CPU servers and share the file servers.

The CPU server performs compilation, text processing, and other applications. It has no local storage; all the permanent files it accesses are provided by remote servers. Transient parts of the name space, such as the collected images of active processes or services provided by user processes, may reside locally but these disappear when the CPU server is rebooted. Plan 9 CPU servers are as interchangeable for their task—computation—as are ordinary terminals for theirs.

File Servers

The Plan 9 file servers hold all permanent files. The current server is another Silicon Graphics computer with two processors, 64 megabytes of memory, 600 megabytes of magnetic disk, and a 300 gigabyte jukebox of write-once optical disk (WORM). It connects to Plan 9 CPU servers through 20 megabyte-per-second DMA links, and to terminals and other machines through conventional networks.

The file server presents to its clients a file system rather than, say, an array of disks or blocks or files. The files are named by slash-separated components that label branches of a tree, and may be addressed for I/O at the byte level. The location of a file in the server is invisible to the client. The true file system resides on the WORM, and is accessed through a two-level cache of magnetic disk and RAM. The contents of recently-used files reside in RAM and are sent to the CPU server rapidly by DMA over a high-speed link, which is much faster than regular disk although not as fast as local memory. The magnetic disk acts as a cache for the WORM and simultaneously as a backup medium for the RAM. With the high-speed links, it is unnecessary for clients to cache dam; instead the file server centralizes the caching for all its clients, avoiding the problems of distributed caches.

The file server actually presents several file systems. One, the "main" system, is used as the file system for most clients. Other systems provide less generally-used data for private applications. One service is unusual: the backup system. Once a day, the file server freezes activity on the main file system and flushes the data in that system to the WORM. Normal file service continues unaffected, but changes to files are applied to a fresh hierarchy, fabricated on demand, using a copy-on-write scheme. Thus, the file tree is split into two: a read-only version representing the system at the time of the dump, and an ordinary system that continues to provide normal service. The roots of these old file trees are available as directories in a file system that may be accessed exactly as any other (read-only) system. For example, the file/usr/rob/doe/plan9 .ms as it existed on Apr. 1, 1990, can be accessed through the backup file system by the name/1990/0401/usr/rob/doc/plan9 .ms. This scheme permits recovery or comparison of lost flies by traditional commands such as file copy and comparison routines rather than by special utilities in a backup subsystem. Moreover, the backup system is provided by the same file server and the same mechanism as the original files so permissions in the backup system are identical to those in the main system; one cannot use the backup data to subvert security.

Terminals

The standard terminal for Plan 9 is termed herein a Gnot (with silent 'G'). The Gnot is a locally-designed machine of which several hundred have been manufactured. The terminal's hardware is reminiscent of a diskless workstation: 4 or 8 megabytes of memory, a 25 MHz 68020 processor, a 1024×1024 pixel display with two bits per pixel, a keyboard, and a mouse. It has no external storage and no expansion bus; it is a terminal, not a workstation. A 2 megabit per second packet-switched distribution network connects the terminals to the CPU and file servers. Although the bandwidth is low for applications such as compilation, it is more than adequate for the terminal's intended purpose: to provide a window system, that is, a multiplexed interface to the rest of Plan 9.

Unlike a workstation, the Gnot does not handle compilation; that is done by the CPU server. The terminal runs a version of the CPU server's operating system, configured for a single, smaller processor with support for bitmap graphics, and uses that to run programs such as a window system and a text editor. Files are provided by the standard file server over the terminal's network connection.

Just like old character terminals, all Gnots are equivalent, as they have no private storage either locally or on the file server. They are inexpensive enough that every member of a research center can have two: one at work and one at home. A person working on a Gnot at home sees exactly the same system as at work, as all the files and computing resources remain at work where they can be shared and maintained effectively.

Networks

Plan 9 has a variety of networks that connect the components. CPU servers and file servers communicate over back-to-back DMA controllers. That is only practical for the scale of, say, a computer center or departmental computing resource. More distant machines are connected by traditional networks such as Ethernet or Datakit. A terminal or CPU server may use a remote file server completely transparently except for performance considerations. As the Datakit network spans the country, Plan 9 systems can be assembled on a large scale. To keep their cost down, Gnots employ an inexpensive network that uses standard telephone wire and a single-chip interface. (The throughput is respectable, about 120 kilobytes per second.) Since the terminal only mediates communication—it instructs the CPU server to connect to the file server but does not participate in the resulting communication—the relatively low bandwidth to the terminal does not affect the overall performance of the system.

FIG. 7 shows the components and topology of Plan 9. Plan 9 system 701 consists of file servers 705, CPUs 703, and Gnots 711. Clusters 717 of CPUs 703 and file servers 705 and clusters 719 of Gnots 711 are connected by a nationwide long-haul communications network 715; Gnots 711 within a cluster 719 are connected by a distribution network 713 such as a LAN and file servers 705 and CPUs 703 within a cluster 717 are connected by a high-speed DMA link 709.

Name Spaces

There are two kinds of name space in Plan 9: the global space of the names of the various servers on the network and the local space of files and servers visible to a process. Names of machines and services connected to Datakit are hierarchical, for example nj/mh/astro/helix, defining (roughly) the area, building, department, and machine in a department. Because the network provides naming for its machines, global naming issues need not be handled directly by Plan 9. However one of Plan 9's fundamental operations is to attach network services to the local name space on a per-process basis. This fine-grained control of the local name space is used to address issues of customizability, transparency, and heterogeneity.

The protocol for communicating with Plan 9 services is file-oriented; all services must implement a file system. That is, each service, local or remote, is arranged into a set of file-like objects collected into a hierarchy called the name space of the server. For a file server, this is a trivial requirement. Other services must sometimes be more imaginative. For instance, a printing service might be implemented as a directory in which processes create files to be printed. Other examples are described in the following sections; for the moment, consider just a set of ordinary file servers distributed around the network.

When a program calls a Plan 9 service (using mechanisms inherent in the network and outside Plan 9 itself) the program is connected to the root of the name space of the service. Using the protocol, usually as mediated by the local operating system into a set of file-oriented system calls, the program accesses the service by opening, creating, removing, reading, and writing files in the name space.

From the set of services available on the network, a user of Plan 9 selects those desired: a file server where personal files reside, perhaps other file servers where data is kept, or a departmental file server where the software for a group project is being written. The name spaces of these various services are collected and joined to the user's own private name space by a fundamental Plan 9 operator, called attach, that joins a service's name space to a user's. The user's name space is formed by the union of the spaces of the services being used. The local name space is assembled by the local operating system for each user, typically by the terminal. The name space is modifiable on a per-process level, although in practice the name space is assembled at log-in time and shared by all that user's processes.

To log in to the system, a user sits at a terminal and instructs it which file server to connect to. The terminal calls the server, authenticates the user (see below), and loads the operating system from the server. It then reads a file, called the profile, in the user's personal directory. The profile contains commands that define what services are to be used by default and where in the local name space they are to be attached. For example, the main file server to be used is attached to the root of the local name space, /, and the process file system is attached to the directory/proc. The profile then typically starts the window system.

Within each window in the window system runs a command interpreter that may be used to execute commands locally, using file names interpreted in the name space assembled by the profile. For computation-intensive applications such as compilation, the user runs a command cpu that selects (automatically or by name) a CPU server to run commands. After typing cpu, the user sees a regular prompt from the command interpreter. But that command interpreter is running on the CPU server in the same name space—even the same current directory—as the cpu command itself. The terminal exports a description of the name space to the CPU server, which then assembles an identical name space, so the customized view of the system assembled by the terminal is the same as that seen on the CPU server. (A description of the name space is used rather than the name space itself so the CPU server may use high-speed links when possible rather than requiring intervention by the terminal.) The cpu command affects only the performance of subsequent commands; it has nothing to do with the services available or how they are accessed.

Although there is a large catalogue of services available in Plan 9, including the service that finds services, a few suffice to illustrate the usage and possibilities of this design.

The Process File System

An example of a local service is the 'process file system', which permits examination and debugging of executing processes through a file-oriented interface.

The root of the process file system is conventionally attached to the directory/proc. (Convention is important in Plan 9; although the name space may be assembled willy-nilly, many programs have conventional names built in that require the name space to have a certain form. It doesn't matter which server the program/bin/rc (the command interpreter) comes from but it must have that name to be accessible by the commands that call on it.) After attachment, the directory/proc itself contains one subdirectory for each local process in the system, with name equal to the numerical unique identifier of that process. (Processes running on the remote CPU server may also be made visible; this will be discussed below.) Each subdirectory contains a set of files that implement the view of that process. For example,/proc/77/mem contains an image of the virtual memory of process number 77. Plan 9's/proc implements other functions through other files. Here is a list of the files provided for each process.

mem The virtual memory of the process image. Offsets in the file correspond to virtual addresses in the process.

ctl Control behavior of the processes. Messages sent (by a write system call) to this file cause the process to stop, terminate, resume execution, etc.

text The file from which the program originated. This is typically used by a debugger to examine the symbol table of the target process, but is in all respects except name the original file; thus one may type '/proc/77/text' to the command interpreter to instantiate the program afresh.

note Any process with suitable permissions may write the note file of another process to send it an asynchronous message for interprocess communication. The system also uses this file to send (poisoned) messages when a process misbehaves, for example divides by zero.

status A fixed-format ASCII representation of the status of the process. It includes the name of the file the process was executed from, the CPU time it has consumed, its current state, etc.

The status file illustrates how heterogeneity and portability can be handled by a file server model for system functions. The command cat/proc/*/status presents (readably but somewhat clumsily) the status of all processes in the system; in fact the process status command ps is just a reformatting of the ASCII text so gathered. The source for ps is a page long and is completely portable across machines. Even when /proc contains files for processes on several heterogeneous machines, the same implementation works.

It is worth noting that the services/proc provides, although varied, do not strain the notion of a process as a file. For example, it is not possible to terminate a process by attempting to remove its process file nor is it possible to start a new process by creating a process file. The files give an active view of the processes, but they do not literally represent them. This distinction is important when designing services as file systems.

The Window System

In Plan 9, user programs, as well as specialized stand-alone servers, may provide file service. The window system is an example of such a program; one of Plan 9's most unusual aspects is that the window system is implemented as a user-level file server.

The window system is a server that presents a file /dev/cons, similar to the /dev/tty or CON: of other systems, to the client processes running in its windows. Because it controls all I/O activities on that file, it can arrange that each window's group of processes sees a private /dev/cons. When a new window is made, the window system allocates a new /dev/cons file, puts it in a new name space (otherwise the same as its own) for the new client, and begins a client process in that window. That process connects the standard input and output channels to /dev/cons using the normal file opening system call and executes a command interpreter. When the command interpreter prints a prompt, it will therefore be written to /dev/cons and appear in the appropriate window.

It is instructive to compare this structure to other operating systems. Most operating systems provide a file like /dev/cons that is an alias for the terminal connected to a process. A process that opens the special file accesses the terminal it is running on without knowing the terminal's precise name. Since the alias is usually provided by special arrangement in the operating system, it can be difficult for a window system to guarantee that its client processes can access their window through this file. This issue is handled easily in Plan 9 by inverting the problem. A set of processes in a window shares a name space and in particular dev/cons, so by multiplexing /dev/cons and forcing all textual input and output to go through that file the window system can simulate the expected properties of the file.

The window system serves several files, all conventionally attached to the directory of I/O devices,/dev. These include cons, the port for ASCII I/O; mouse, a file that reports the position of the mouse; and bitblt, which may be written messages to execute bitmap graphics primitives. Much as the different cons files keep separate clients' output in separate windows, the mouse and bitblt files are implemented by the window system in a way that keeps the various clients independent. For example, when a client process in a window writes a message (to the bitblt file) to clear the screen, the window system clears only that window. All graphics sent to partially or totally obscured windows is maintained as a bitmap layer, in memory private to the window system. The clients are oblivious of one another.

Since the window system is implemented entirely at user level with file and name space operations, it can be run recursively: it may be a client of itself. The window system functions by opening the files /dev/cons,/dev/bitblt, etc., as provided by the operating system, and reproduces—multiplexes—their functionality among its clients. Therefore, if a fresh instantiation of the window system is run in a window, it will behave normally, multiplexing its /dev/cons and other files for its clients. This recursion can be used profitably to debug a new window system in a window or to multiplex the connection to a CPU server. Since the window system has no bitmap graphics code—all its graphics operations are executed by writing standard messages to a file—the window system may be run on any machine that has /dev/bitblt in its name space, including the CPU server.

CPU-Command

The cpu command connects from a terminal to a CPU server using a full-duplex network connection and runs a setup process there. The terminal and CPU processes exchange information about the user and name space, and then the terminal-resident process becomes a user-level file server that makes the terminal's private files visible from the CPU server. In a preferred embodiment, the CPU server builds the name space by re-executing the user's profile; in an alternative embodiment, the name space will be exported by a special terminal-resident server that can be queried to recover the terminal's name space. The CPU process makes a few adjustments to the name space, such as making the file /dev/cons on the CPU server be the same file as on the terminal, perhaps making both the local and remote process file system visible in /proc, and begins a command interpreter. The command interpreter then reads commands from, and prints results on, its file /dev/cons, which is connected through the terminal process to the appropriate window (for example) on the terminal. Graphics programs such as bitmap editors also may be executed on the CPU server since their definition is entirely based on I/O to files 'served' by the terminal for the CPU server. The connection to the CPU server and back again is utterly transparent.

This connection raises the issue of heterogeneity: the CPU server and the terminal may be, and in the current system are, different types of processors. There are two distinct problems: binary data and executable code. Binary data can be handled two ways: by making it not binary or by strictly defining the format of the data at the byte level. The former is exemplified by the status file in /proc, which enables programs to examine, transparently and portably, the status of remote processes. Another example is the file, provided by the terminal's operating system, /dev/time. This is a fixed-format ASCII representation of the number of seconds since the epoch that serves as a time base for programs requiring time stamps. Processes on the CPU server get their time base from the terminal, thereby obviating problems of distributed clocks.

For files that are I/O intensive, such as /dev/bitblt, the overhead of an ASCII interface can be prohibitive. In Plan 9, such files therefore accept a binary format in which the byte order is predefined, and programs that access the files use portable libraries that make no assumptions about the order. Thus /dev/bitblt is usable from any machine, not just the terminal. This principle is used throughout Plan 9. For instance, the format of the compilers' object files and libraries is similarly defined, which means that object files are independent of the type of the CPU that compiled them.

Having different formats of executable binaries is a thornier problem, and Plan 9 solves it as follows: directories of executable binaries are named appropriately: /mips/bin,/68020/bin, etc., and a program may ascertain, through a special server, what CPU type it is running on. A program, in particular the cpu command, may therefore attach the appropriate directory to the conventional name/bin so that when a program runs, say, /bin/rc, the appropriate file is found. Although this is a fairly clumsy solution, it works well in practice. The various object files and compilers use distinct formats and naming conventions, which makes cross-compilation painless, at least once automated by make or a similar program.

Security

Plan 9 does not address security issues directly, but some of its aspects are relevant to the topic. Breaking the file server away from the CPU server enhances the possibilities for security. As the file server is a separate machine that can only be accessed over the network by the standard protocol, and therefore can only serve files, it cannot run programs. Many security issues are resolved by the simple observation that the CPU server and file server communicate using a rigorously controlled interface through which it is impossible to gain special privileges.

Of course, certain administrative functions must be performed on the file server, but these are available only through a special command interface accessible only on the console and hence subject to physical security. Moreover, that interface is for administration only. For example, it permits making backups and creating and removing files, but it does not permit reading files or changing their permissions. The contents of a file with read permission for only its owner will not be divulged by the file server to any other user, even the administrator.

Of course, this begs the question of how a user proves who he or she is. In a preferred embodiment, this is done using a simple authentication manager on the Datakit network itself, so that when a user logs in from a terminal, the network assures the authenticity of the maker of calls from the associated terminal. The need for trust in a local network may be eliminated by replacing the authentication manager by a Kerberos-like system.

Overview of the Architecture of Plan 9 Services: FIG.1

As already mentioned, Plan 9 services are implemented as file systems, that is, the service appears to a process executing on a computer with a Plan 9 operating system as a set of files. The process can obtain data from the service by performing file read operations on "files" provided by the service and can provide data to the service by performing file write operations on the "files". As already explained in detail with regard to the "file system" provided by the process service, the service need not actually maintain files, but must merely be able to respond to requests for file operations by a process as ff it did maintain them. For example, when a process reads a "file" maintained by the service, the service must provide data to the process reading the "file".

FIG. 1 provides an overview of the relationship between Plan 9 services and processes. Service architecture 101 shows how processes 102 employ file system 109 to access one or more services 123. The processes 102 may be executing either on a Gnot 711 or a CPU 703 and the services may be implemented either locally to the processor where process 102 is executing or in a remote device such as a file server 705.

As shown in FIG. 1, each service 123 provides one or more trees of files 125 to the processes 102 which use the service. The trees of files are made up of data files 131 and directory files 127 and 129. A directory file is a file which contains a list of files. The files listed in the directory files may be either directory files or data files. As may be seen from file tree 125(*a*), data files 131 B, C, and D are the "leaves" of the file tree, while directory file 129 occupies the point where the tree branches. At the base of the entire tree, there is a single root directory file 127. Each file in a service 123 has a file name. In a preferred embodiment, the file name is a character string.

A process 102 accesses a file in a service 123 by means of calls to file system functions provided by the Plan 9 operating system. There are two main classes of functions: file locator functions (FL) 113, which locate files, and file access functions (FA) 111, which access files after they have been located by file access functions 111. Calls to file locator functions 113 are represented by arrows 107, and those to file access functions 111 are represented by arrows 105.

As mentioned above, each Plan 9 process 102 has a name space associated with it. A process 102's name space determines which files provided by services 123 a process 102 may access. A process 102's name space in a preferred embodiment consists of a single file tree 117 which is assembled out of file trees 125 and/or subtrees of those file trees. Thus name space 115(*o*) maintained and used by file locator functions 113 is the name space for process 102(*a*). As may be seen from FIG. 1, process 102(*a*)'s name space contains file tree 117(*o*) which includes 125(*a*) from service 123(*a*) and file tree 125(*k*) from service 123(*k*), but does not include file tree 125(*b*) from service 123(*b*). File tree 117(0) has been constructed by making the directory file "X" in process 102's file tree 117(*o*) equivalent to the root of tree 125(*a*) and making the directory file "Y" in file tree 117(*o*) equivalent to the root of file tree 125(*k*). How "X" and "Y" themselves came to be in name space 115(*o*) will be explained in detail later.

Within name space 115(*o*), a file may be located by means of a path name. A path name is a list of file names which includes the name of the file which is to be located and the names of all of the directory files between the point in the file tree from which the file is being located to the file. The point in the file tree from which the file is being located is termed the working directory. Thus, if the working directory is the directory file X, the pathname is A/C. The "/" character in A/C serves to separate the names in the path name. Additionally, any file may be located by specifying its full path name, that is, the "/" character, representing the root directory, the names of all of the directories between the root directory and the file, and the name of the files. The names of the files are again separated by "/". Thus, the full path name of Thus, the complete pathname for file C in name space 115(*o*) is /X/A/C.

In Plan 9, a number of processes 102 may share a name space. The processes 102 sharing a name space make up a process group 103; thus, the processes in process group 103(*o*) share name space 115(0) defined by file tree 117(*o*), while the processes in process group 103(*z*) share name space 115(*z*). Processes are created in Plan 9 by means of the "fork" system call. The newly-created process 102 remains associated with the same name space 115 as the process which made the "fork" system call and therefore belongs to the same process group 103 as the process 102 which made the fork system call. A new process group 103 is established when a process 102 makes the "forkpgrp" system call. The call has a single argument: a flag indicating whether the new process group should receive a copy of process 102's old name space 105 or receive a minimal default name space 105. Execution of the system call places the process 102 making the system call in the new process group. Once a new name space 115 has been established for a process 102 by the forkpgrp system call, changes in new name space 115 do not affect the old name space 115 of process group 103 to which the process 102 making the forkpgrp system call formerly belonged.

Any process 102 which belongs to a process group 103 may modify the name space 115 for the process group. To do so, the process uses one of two name space modification functions. The first of these is "bind", which makes a name which is already in the name space equivalent to file specified by a new path name. After the bind, references to the file specified by the old path name will be interpreted as references to the file specified by the new path name. For example, a "bind ("/Y/H","/X/A")" function call in name space 115(*o*) may be used to replace the subtree whose root is A in name space 115(*o*) with the subtree whose root is H in that name space. After the bind, the pathname /X/A/K will refer to the file K of subtree H.

The second operation is "mount", which makes a name which is already in the name space equivalent to the root of a service 123. As will be explained in more detail later, the root of the service is represented by a file descriptor, which is a small integer. Thus, the directory name "X" of file tree 117(*o*) was made equivalent to the root of file tree 125(*a*) of service 123(*a*) by the mount function "mount (FD, "/X"). After the mount, the pathname /X/A refers to file "A" in file tree 125(*a*).

A further refinement of "mount" and "bind" in Plan 9 is that three different kinds of relationships between the pathnames or between the file descriptor and the pathname may be specified. The first relationship is replacement. If that relationship is specified, whatever is referred to by the new name or the file descriptor completely replaces whatever is referred to by the old name. The second and third relationships establish what is termed union directories. When a union directory is established, the old name and the new name used in the bind function must both refer to directory files and the old name in the mount command must refer tp a directory file, while the file descriptor must refer to the root of a file tree in a service 123. The effect of the bind or mount is to establish a new directory which is the union of the files in the old and new directory files. One relationship, before, establishes a union directory in which the new directory is searched before the old directory; the other relationship, after, establishes a union directory in which the new directory is searched after the old directory. Thus, the bind command "bind("/Y/H","/X/A",BEFORE) establishes a directory in which the files I,J,K precede the files B and C, and when file locator functions 113 respond to the pathname /X/A/C, they will first search through the directory H and then through the directory A. By thus determining the order in which the locator functions search through directories for a file, the union directories provide the same kind of control as is provided by search lists in operating systems such as UNIX.

File locator functions 113 which locate files instead of rearranging the name space take a path name as an argument and return a file descriptor. In this context, the file descriptor is a small integer which is used in file access functions 111 to refe to the file. The file locator functions 113 include "chdir", which makes the directory file specified by the pathname into the process 102's working directory, and "open", which opens the file specified by the pathname. Both "chdir" and "open" return file descriptors for the working directory file and the opened file respectively. Additionally, the "create" function works as does "open", except that the file specified in the path name is created. File access functions 105 then use the file descriptor provided by the file locator functions to read the file, write the file, set and obtain the file's status, and to close the file.

In architecture 101, file system 109 translates the file access calls 105 and the file locator calls 107 made by a process 102 into service file operation requests. Each service file operation request requests a service 123 to perform an operation on a file in one of its file trees 125. Again, there are two classes of such requests: service file access requests, indicated by arrow 119, and service file locator requests, indicated by arrow 121. As will be explained in more detail, requests 119 and 121 for some services 123 take the form of function calls; for other services 123, the requests take the form of file protocols. In the case of the function calls, files are represented by file names or file descriptors; in the case of the file protocols, files are represented by file names or file identifiers; for the purpose of the following discussion, both file descriptors and file identifiers will be subsumed in the term file specifiers.

In file system 109, a file descriptor employed by a process 102 is associated with a qid, a file handle provided by service 123. The association may be either direct or indirect, by way of the association of a file descriptor with a file identifier and the association of the file identifier with the qid. When there is an association between a file descriptor used by a process 102 and a qid, the process 102 is said to have a connection to the file represented by the qid. Similarly, in service 123, the qid is associated with one or more file specifiers. Any file system call 105 or 107 which results in a service file request having a file specifier associated with a given qid will result in the file operation being performed on the file identified by the qid.

An advantage of representing a file by a name or a file specifier in file system 109 but by a name or a qid in services 123 is that different services can establish different relationships between file names and qids. For example, in some services, such as the process service explained above, it is advantageous for the file names used by all processes to refer to a single set of files; in other services, such as the 8.5 window service to be described in detail later, the file names used by each process refer to a set of files peculiar to that process. As a result, file names in architecture 101 have properties analogous to those of variables in programming languages such as C. Some file names are like global static variable names: as the global static variable name refers to the same memory location in all code in which the variable name appears, so file names like those provided by the process service refer to the same files in all processes. Other file names are like local variable names: as the local variable name refers to a different memory location in every invocation of a procedure, so file names like those provided by the 8.5 server refer to different files in each process. Which properties a file name has is of course determined by the service 123 which provides the file. In analogy with the terminology used with variables, services 123 are said to provide instances of their files; thus, the process service provides a single instance of each of its files, and any process 102 which has a connection to one of the files provided by the service has access to the same file as all of the other processes 102 which has a connection to that file. The window service, on the other hand, provides separate instances of the files in its file tree to each process 102 which establishes a connection with the root of the file tree; any process 102 which has a connection with a file provided by the window service has a connection to one of the multiple instances of that file.

Each service 123 is able to handle the following classes of service file locator requests 121:

attach: given a file specifier for the root of a file tree in a specified service 123, return a qid for the root to file system 109;

walk: search a directory file specified by a file specifier for a file having a given name, and if the file is found, associate the file specifier with the qid for the file and return the qid;

create: make a new file in a directory file specified by a file specifier, give the file a specified name, associate the file specifier with the qid for the new file; and return the qid;

remove: remove a file specified by a file specifier from the server, disassociate the file specifier from the qid, and return the name of the file being removed.

Each service 123 is further able to handle the following classes of service file access requests:

open: prepare a file specified by a file specifier for file access operations and return the qid associated with the file specifier;

clone: given a first file specifier representing a file and a second file specifier which does not yet represent a file, associate the second file specifier with the file associated with the first file specifier;

read: given a file specifier, an offset in the file, and a count, read the number of bytes specified in the count beginning at the offset;

write: given a file specifier, an offset in the file, a count, and data, write the data into the number of bytes specified in the count beginning at the offset;

clunk: given a file specifier, end the association between the file specifier and the file.

stat: given a file specifier and information required by the service to obtain file status information, return the file's status;

wstat: given a file specifier and information required by the service to change the file's status, change the file's status.

While all services 123 must implement the above operations, in some cases, the operation may in fact have no effect or produce an error. For example, if a service 123 is a printer, and thus can implement only write-only "files", a read operation will produce an error.

Figures 2, 3:
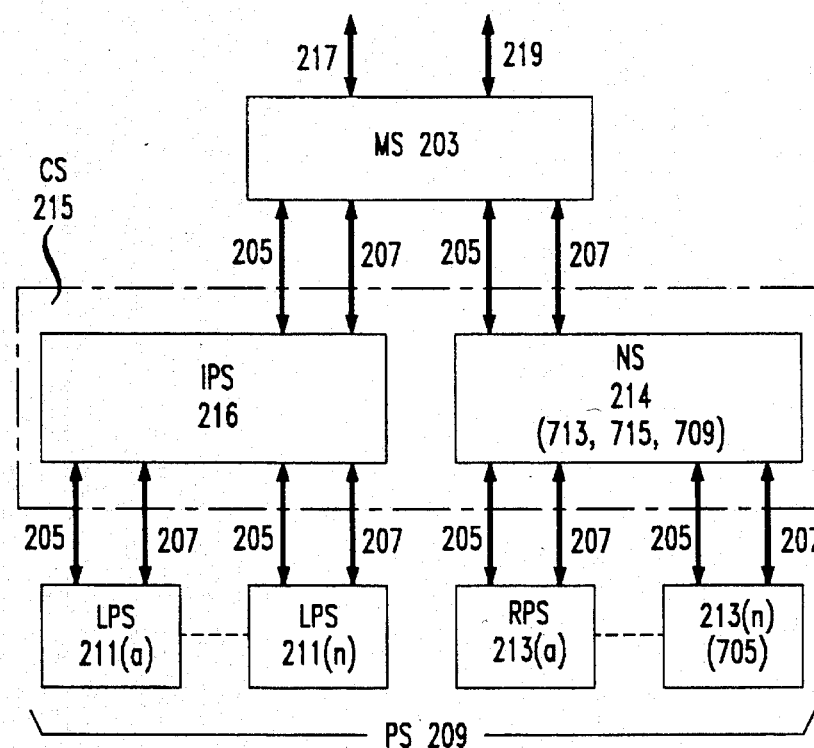
FIG. 2 is an overview of the mount service and protocol services in the operating system.
FIG. 3 is a diagram of the CHANNEL data structure.

Kernel Services and Protocol Services: FIG. 2

There are two types of services 123 in a preferred embodiment of Plan 9. Kernel services are services in which service file operation requests 205 and 207 are implemented by means of calls to Plan 9 kernel functions. Protocol services are services in which service file operation requests 205 and 207 are implemented by means of the Plan 9 file protocol. In the protocol services, each service file operation request is initiated by a tmessage transmitted for a process 102 to a protocol service. The protocol service replies to the tmessage with a rmessage which contains information returned from the protocol service to the process. The tmessage and rmessage making up a service file operation request for a protocol service are termed a transaction. For example the service file read operation request for a protocol service is a read transaction which consists of the following read tmessage and rmessage:

tread: type specifier, file identifier, tag, offset, count rread: type specifier, file identifier, tag, count, data The file identifier is associated with the file descriptor in file system 109 and with the qid in file system 109 and in the protocol service. The tread message includes a type specifier indicating that the message is a tread message, the file identifier, a tag identifying the message, the offset in the file at which the read is to begin, and the number of bytes. The tread message includes a type specifier indicating that the message is an tread message, the file identifier, another tag, the count of bytes actually read, and the data itself. If the read results in an error, protocol service 209 returns an rerror message instead of the tread message. It has the form:

rerror: type specifier, tag, error message string

Each protocol service 209 must be able to perform transactions corresponding to each of the service file operation requests listed above. Since this is all that is required of a protocol service 209, a protocol service 209 may be implemented on a processor which has an architecture completely different from the architecture of the processor upon which mount service 203 is executing. All that is required to use a protocol service 209 is a connection to the protocol service 209 over which the protocols may be transmitted and received. Further, in a preferred embodiment, the data sent and returned in the protocols has predetermined formats which are used by all protocol services 209 which provide a given file tree. Thus, a process 102 may use any protocol service which provides the given file tree, regardless of the type of machine the process 102 is executing on and the type of machine the protocol service 209 is executing on.

FIG. 2 shows the relationship between protocol services and the rest of architecture 101. As shown in the figure, protocol services (PS) 209 perform file locator transactions 205 and file access transactions 207 involving file protocols corresponding to the service file locator requests and service file access requests explained above. A special kernel service, mount service 203, receives function calls 217 specifying service file locator requests and function calls 219 specifying service file access requests from file system 109. Mount service 203 then responds to the function calls by performing corresponding transactions with protocol services 209. To perform the transactions, mount service 203 employs a number of communications services 215. There are two types of such communications services: network communications services (NS) 214 and inter-process communications services (IPS) 216. Network communications services employ networks to communicate with remote protocol servers 213 which are connected via the networks to the CPU upon which process 102 is executed. Interprocess communications services 216 employ an interprocess communications system to communicate with local protocol servers 211. In a preferred embodiment, the interprocess communications system employed by IPS 216 is a pipe system like that in the UNIX operating system. When a communications service 215 is connected to a protocol server 209, it is represented by a file descriptor. It is these file descriptors which are employed in the "mount" system call.

As may be seen by the reference numbers in parentheses, network communications services 215 may employ distribution network 713, long haul network 715, and DMA network 705 of FIG. 7 and the remote protocol services 213 may include one or more file services 705. Local protocol services 211 may be devices such as the 8.5 services for GNOT 711 or even other processes 102 which communicate with the given process 102 by means of interprocess communications facilities. As indicated above, the distinction between a protocol service 209 and a kernel service like mount service 203 is not location, but merely that protocol service 209 performs transactions with mount service 203. As will be seen in detail in the following description of the 8.5 service, an advantage of this characteristic of protocol services 209 is that the same protocol service 209 may be used by both a process 102 running on a local processor and a process 102 running on a remote processor such as CPU 703 of FIG. 7.

Implementing File Operations in Plan 9

The following will discuss the implementation of file operations in Plan 9, beginning with the data structures used to represent files and relate them to processes 102 and services 123, continuing with the data structures used to represent process name space 115, and ending with examples of certain typical file operations.

Figure 4:
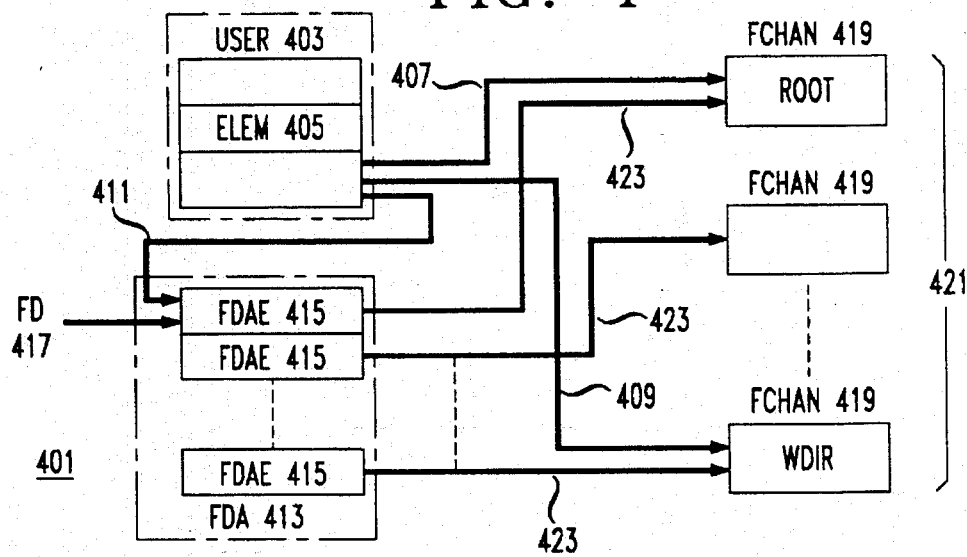
FIG. 4 is a diagram of the data structures used to locate open files.
Figure 5:
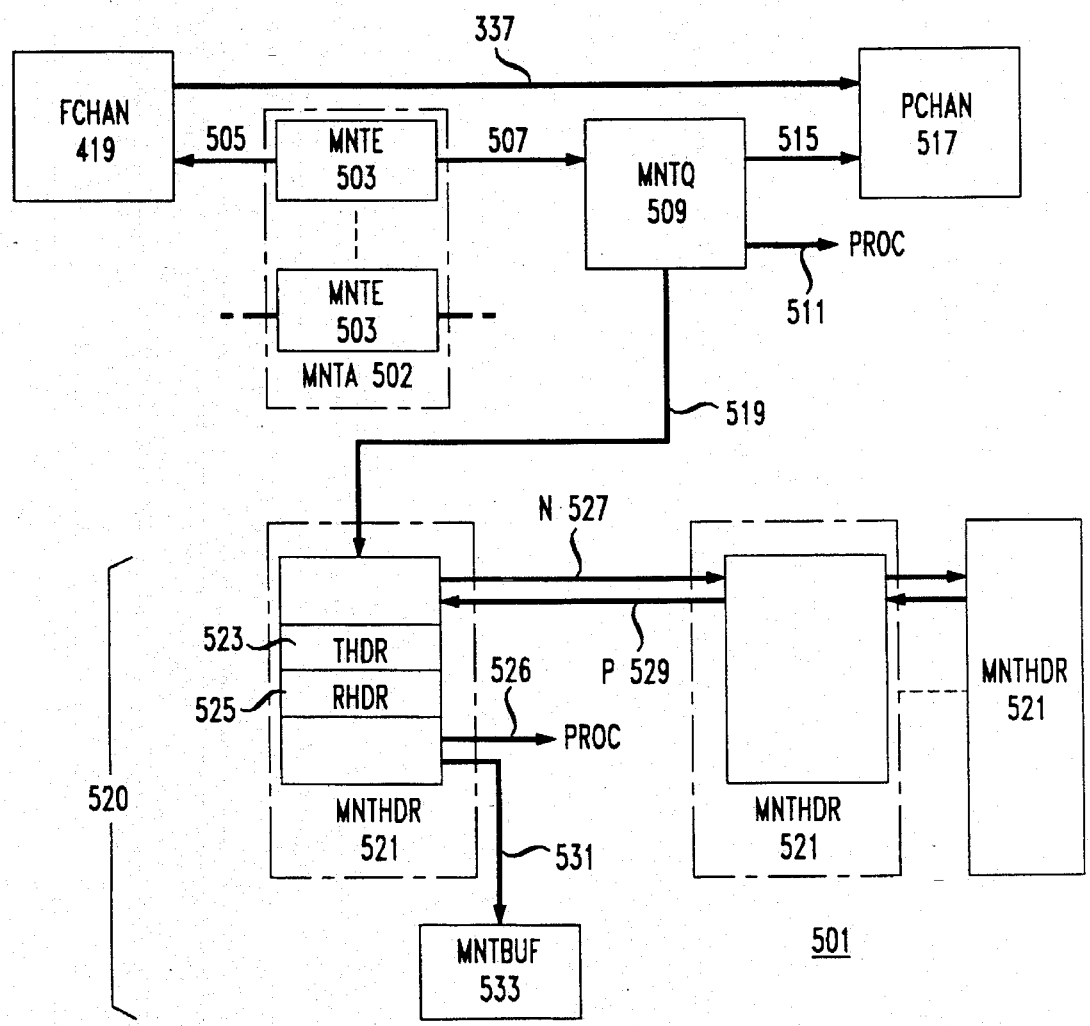
FIG. 5 is a diagram of the data structures used to send protocols to and receive protocols from protocol services.

Representing A Connection between a Process 102 and a File: FIGS. 3–5

Any file to which a process 102 has a connection is represented by a channel data structure. At a minimum, the channel data structure for a file specifies the service 123 which is providing the file and associates the qid provided by service 123 with the file descriptor which process 102 uses to refer to the file. If service 123 is a protocol service 209, the channel further associates the file identifier used for the file in the file protocols and a protocol channel for the file protocols with the file descriptor.

FIG. 3 is a diagram of the channel data structure. Channel data structure 301 has the following components:

lock 303, which bars more than one process from having access to channel 301 at the same time;

reference count (ref) 307, which indicates whether the channel is pointed to by other kernel data structures;

next/offset field 309: when channel 301 is not in use, it is stored in a list of unused channels 301, and in that case, the next/offset field points to the next unused channel 301; when the file represented by channel 301 is being accessed, next/offset specifies the current offset into the file.

Kernel service information (KSINFO) 311: The next two fields contain information which specifies the kernel service which provides the file represented by the channel 301;

type 313: this field specifies the kernel service by means of which the file represented by the channel 301 is accessed; for protocol services 209, type field 313 specifies mount service 203;

device (dev) 315: this field specifies a specific device represented by the kernel service; in the case of mount service 203, the device field 315 specifies the protocol service 209 which provides the file represented by channel 301; p1 Access information (AINFO) 317: the next three fields contain information needed to perform file accesses;

mode 319 indicates how the file represented by the channel may be accessed;

flag 319 contains status information about the file;

qid 323 is the qid which the sen,ice which provides the file has assigned to the file;

Mount Information (MINFO) 325 indicates where information concerning binds and mounts affecting the pathname of the file represented by the channel 301 may be found;

mountptr 327 is a pointer to a data structure from which the information concerning the binds and mounts may be found;

mountid 329 is an identifier for the data structure pointed to by mountptr 327;

file identifier (FID) 331 is the file identifier which mount service 203 provides to protocol service 209 providing the file represented by channel 301 and which protocol service 209 associates with qid 323 for the file as long as the file is connected; in a preferred embodiment, file identifier 331 is set to a unique value for each channel 301 when the channel 301 is created;

auxiliary information 333 is information whose meaning depends on device type 313;

protocol service information (PSINFO) 335 is information indicating how file protocols may be sent to the protocol service providing the file represented by the channel;

protocol channel (PCHAN) 337 is a pointer to a channel structure 301 which represents the communications service 215 used for transactions with the file represented by the present channel structure;

mqid 339 is the qid of the root directory of the file tree in the protocol service which contains the file represented by the channel 301.

Each process 102 is associated with a set of files with which it has connections. The set of files may include files with which connections were established by ancestors of process 102 and which were "inherited" by process 102 when it was created by the "fork" system call and files with which the connections were established by process 102 itself. The association is achieved by means of the data structures 401 shown in FIG. 4. Data structures 401 further associate each file in the set with the file descriptor which process 102 uses to refer to the file.

The starting point for access to data structures 401 is user dam structure 403 for process 102. A pointer 411 in user data structure 403 points to file descriptor array (FDA) 413. File descriptor array 413 is an array of pointers 423 to channels 401 which is indexed by file descriptor (FD) 417. If a file belongs to the set of files connected to process 102, the entry (FDAE) 415 in array 413 corresponding to the file descriptor for the file will contain a pointer 423 to a channel structure 301 for the file. Such channel structures appear in FIG. 4 as file channel structures 419. There is a set 421 of such file channels 419 corresponding to the set of files with which process 102 is connected. In a preferred embodiment, file descriptor array 413 has 100 elements, and consequently, each process 102 may be connected to up to 100 files.

As previously indicated, file locator functions such as "bind", "mount", "chdir", or "open" take a path name as an argument and return the file descriptor 417 for the file. As will be explained in more detail below, access to file channels 419 for purposes of path name interpretation is provided by a pointer 407 in user structure 403 to file channel 419 for the root of process 102's file tree and another pointer 409 to file channel 419 for process 102's working directory. Another component of user 403 which is employed in path name interpretation is element (ELEM) 405, which contains the name in the list of names making up the pathname which is currently being interpreted.

When the file represented by file channel 419 is provided by a protocol service 209, file channel 419 is associated with a protocol channel which represents a connection via a communications service with a protocol service 209. Protocol channels are also implemented using channel structures 301. In a channel structure 301 serving as a protocol channel, TYPE field 313 specifies either inter-process communications services 216 or network services 214 (in a preferred embodiment, a pipe service or a DATAKIT™ network communications service). Fields 327, 329, and 337 have no meaning in a protocol channel. When the connection represented by the protocol channel is opened by a process 102, a pointer to the protocol channel is placed in file descriptor array 413 for the process 102 and the protocol channel receives the corresponding file descriptor. A connection to a local protocol service by means of a pipe is opened when the pipe system call creating the pipe is executed by the process 102, and a connection to a remote protocol service 209 by means of a DATAKIT connection is opened when the file representing the remote protocol service 209 in the srv service is opened.

FIG. 5 shows the data structures 501 employed in a preferred embodiment to associate a file channel 419 with a protocol channel and with data structures representing the tmessages and rmessages. As previously indicated, PCHAN field 337 in file channel 419 points to protocol channel 517, which is implemented using a channel structure 301. The data structures representing the tmessages and rmessages are located using mount service array (MNTA) 502. There is an entry (MNTE) 503 in the array for every file channel 419 which represents a file provided by a protocol service 209. Each entry 503 includes an identifier and two pointers: one to file channel 419 corresponding to entry 503 and one to a mount service queue structure (MNTQ) 509. File channel 419 in turn contains the identifier for entry 503 as part of the information in dev field 315. Mount service queue structure 509 contains a pointer 511 to a data structure representing the procedure to which file channel 419 belongs, a pointer 515 to protocol channel 517 representing the connection to the protocol service 209 and file tree 125 containing the file represented by file channel 419, and a pointer 519 to a queue of messages 520. The messages in the queue are of course tmessages concerning the file to protocol service 209 and rmessages from protocol service 209. Mount service queue 509 thus associates the queue of messages with protocol channel 517 and with process 102.

Each message 520 is made up at least of a mount service header (MNTHDR) 521. Since there may be more than one outstanding message for the combination of file and process represented by file channel 419, mount service header 521 contains pointers 527 and 529 linking header 521 to headers for other messages for the process-file combination represented by channel 419. Mount service header 521 further contains a pointer 526 to the process data structure for the process to which file channel 419 belongs.

If the message 520 is a rmessage, the parts of the message other than the data are placed in rhdr 525; when the message 520 is a tmessage, the parts of the received message other than the data are placed in thdr 523; these fields thus contain the type of the message, the file identifier which mount service 203 has associated with the file, and other information as required. For example, if the message is a twrite message, thdr 523 contains the message type, the file identifier for the file, the number of bytes to be written, and the offset at which the write is to begin. Additionally, thdr 523 and rhdr 525 contain pointers 531 to mount buffers 533 which contain any data sent or received in the message.

A message 720 is transmitted by a function which takes entry 503 corresponding to file channel 419 and mount header 521 as arguments; the function uses entry 503 to locate protocol channel 517, and message 520 specified by mount header 521 is output to the connection specified by protocol channel 517. Upon transmission, the process 102 sending the message waits for the reply. When the reply arrives, it is placed in a message 520, the process is awakened, and the message 520 is read by the process 102. In a preferred embodiment, the tag in the rmessage is used to locate the proper mount header data structure 521. Functions in Plan 9 which must locate a structure 501 for a given file channel 419 do so by working through mount service array 502 until they find an entry 503 which contains a pointer 505 to the given file channel 419; the file channel is identifiable by the fact that its dev field 315 contains the identifier for the corresponding entry 503.

As is apparent from the foregoing discussion, the data structures shown in FIGS. 3–5 permit a process 102 which has a file descriptor 417 for a file to perform file access functions such as read and write on the file. They are, however, not sufficient to perform file locator functions, since these functions involve path names as well as file descriptors.

Figure 6:
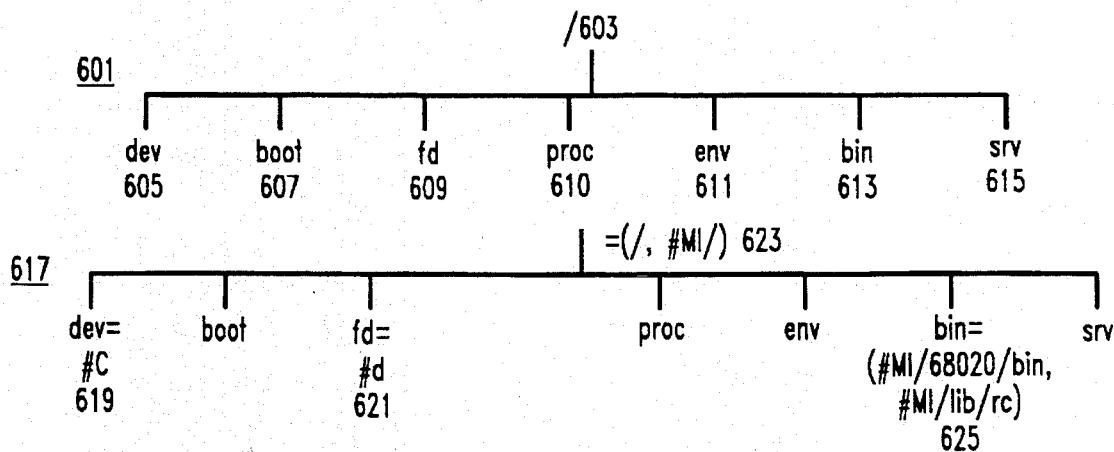
FIG. 6 is a diagram of the file tree provided by the root service and of the file tree after certain bind and mount operations have been performed.
Figure 8:
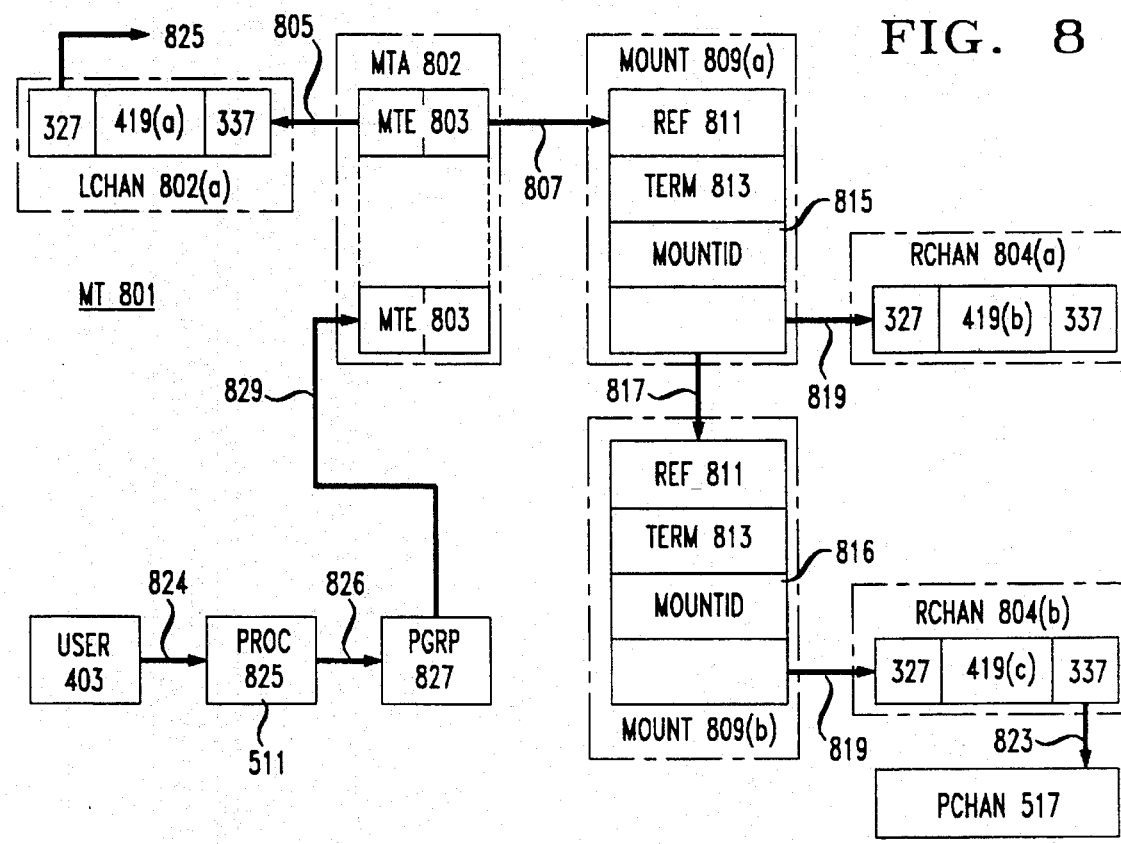
FIG. 8 is a diagram of the mount table of the present invention.
Figure 9:
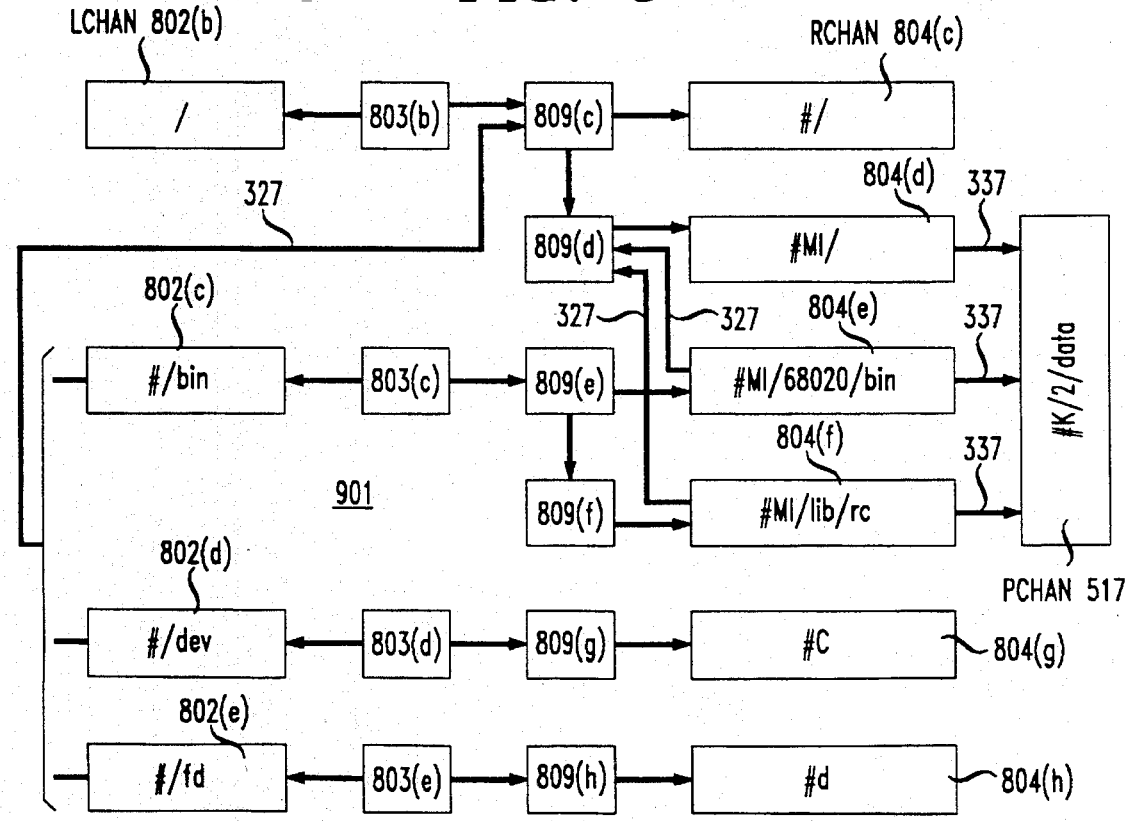
FIG. 9 is a diagram of the mount table for the second file tree of FIG. 6.

Representing Name Space 115: FIGS. 6,8,9

As previously indicated, a new process 102's name space 115 is either inherited from the process 102's parent or is built from a "stub" name space which Plan 9 makes available to a process 102 which does not inherit its parent's name space. FIG. 6 shows conceptually how a process 102's name space 115 is built from the "stub" name space. "Stub" name space 601 in FIG. 6 is provided by the root service, a kernel service which provides a root directory 603 with a single level of "files". Root directory 603 and files 605 to 615 serve only as points to which the roots of trees 125 belonging to other services 123 may be bound. In a preferred embodiment, the set of files 605 through 615 serves to divide up the kinds of services by function. The file names correspond to functions as follows:

dev 605 is the primary location at which services are bound. Services which provide I/O functions and other services having miscellaneous functions are all bound to dev 605;

boot 607 is the location at which the service which boots the CPU upon which Plan 9 is executed is bound;

fd 609 is the location at which the service which provides duplicate file descriptors for a process's connected files is bound;

proc 610 is the location at which the service which provides information about Plan 9 processes is bound;

env 611 is the location at which the service which provides environmental files for a process 102 is bound. These environmental files perform the same functions as the UNIX environmental variables;

bin 613 is the location at which the service which contains files of programs executed by process 102 is bound; and srv 615 is the location at which the service is bound which provides files representing protocol channels 5 17 for the protocol servers 209 available to process 102.

Plan 9 provides a set of built-in services which can be bound to the file names in stub tree 601; some of the services may only be bound by Plan 9 kernel functions executed by process 102; others may be bound by any function executed by process 102. In Plan 9 path names, the names of the built-in services are preceded by the "#" character. The built-in services which may be bound only by kernel functions are the following:

/: the kernel root service which provides stub tree 601;

: the kernel pipe service, which provides UNIX-style pipes for inter-process communication; and

M: mount service 603, which handles transactions with protocol servers 209.

The kernel binds the root service to the root of process 102's name space.

The built-in services which may be bound by any function executed by the process 102 include:

b: the boot service. The service has files which, when written to, cause the kernel to branch to a given address and which permits the kernel to write to a given location in virtual memory. The boot service is generally bound to boot 607;

b: the bit service. The service has files which represent a bit-mapped screen and a mouse. The bit service is generally bound to dev 605;

c: the console service. The service has files which represent a system console. The console service is generally bound to dev 605;

d: the duplicate service. The files provided by the service have names which are the file descriptors for connected files belonging to the process 102. The duplicate service is generally bound to fd 609;

e: the environment service. The files provided by the service are generally bound to env 611;

kname: the datakit service. The files provided by the service represent conversations on the datakit hardware represented by name. The service is generally bound to dev 605;

p: the process service described in the general overview; it is generally bound to proc 610; and s: the service registry service. The files provided by the service represent already-open protocol channels 517 which are connected to protocol services 209.

In a preferred embodiment of Plan 9, when a process 102 which has not inherited its name space 115 begins running on a Gnot 711, the Plan 9 kernel executing on the Gnot 711 performs bind operations which give its name space 115 the form shown as tree 617. Where a name in tree 609 has had a service bound to it, that fact is indicated by "=" followed by the name of the service; if the bind operation created a union directory, that fact is indicated by listing the components of the union directory in parentheses following the "=". The list is in the order in which the components will be searched. Tree 617 has been produced by the following sequence of bind and mount operations:

bind ("#/","/",MREPL), which binds the tree provided by the root service to the "/" representing the root in the path names interpreted by process 102; references to "/" are now interpreted as references to "/" 603;

mount (FD,"/",MAFTER,""), which mounts a protocol channel 517 belonging to mount service 203 on "/", and thereby creates a union directory consisting of the files accessible from the root of the root service and the root of the protocol service 209 represented by protocol channel 517. In Plan 9, that protocol service 209 provides a default file tree 125 in a default file server 705.

bind ("/68020/bin", "/bin",MREPL), which binds the tree whose root is the directory/68020/bin in default file tree 125 to the name bin 613 in stub file tree 601. The directory /68020/bin contains executable code for Gnot 711, which in a preferred embodiment has a Motorola 68020 microprocessor;

bind ("/lib/rc","/bin",MAFTER), which binds the tree whose root is the directory/lib/rc in default tree 125 to the name bin 613. Since/68020/bin has already been bound to bin 613 and MAFTER was specified, the result is a union directory in which the directory/68020/ bin will be searched before the directory/lib/rc.

bind ("#c","/dev",MREPL), which binds the tree provided by the console service #c to the name der 605; and bind ("#d","/fd",MREPL), which binds the tree provided by the duplicate service #d to the name fd in stub tree 601.

As a result of these bindings, process 102 can refer to a file called "cc" in the directory/68020/bin of the protocol service 209 to which #M1 is connected by the path name "/bin/cc" and can refer to a file called "pwd" in/lib/rc of that same protocol service by the path name "/bin/pwd", unless, of course, there is a file "pwd" in/68020/bin. Similarly, the file "pid" provided by the #c service may be referred to by the path name "/dev/pid" and the file "0" provided by the service #d may be referred to by the path name "/fd/0".

As is apparent from the foregoing, name space 115 for a Plan 9 process 102 must contain a record of all of the bind and mount operations which have been performed on names in name space 115. That record is termed herein a mount table. The mount table of the preferred embodiment takes advantage of the fact that a file channel 419 for a file implicitly represents the path name for the file. Because this is the case, a record of the bind and mount operations may be made by establishing relationships between the file channels 419 representing the files represented by the old pathnames employed in the bind operations or mount operations and the file channels 419 representing the files specified by the new path names employed in the bind operations or the file channels 419 corresponding to the file descriptors employed in the mount operations. Of course, all of these file channels 419 represent files connected to some process 102 in a process group 103 from which the current process group 103 inherited its name space or by some process 102 in the current process group 103.

FIG. 8 shows a portion of mount table (MT) 801 as it is implemented in a preferred embodiment. The components of mount table 801 are located from mount table array 802, which in turn is located from user data structure 403. As shown in FIG. 8, user structure 403 includes a pointer 824 to process (PROC) data structure 825. Each process 102 has a user structure 403 and a process data structure 825. Pointer 824 is user structure 403 points to that process 102's process data structure. Process data structure 825 is further pointed to by pointer 511 in mount service queue structure 509 and itself contains a pointer to process group (PRGRP) structure 827, which represents the process group 103 to which process 102 belongs. Process group structure 827, finally, contains a pointer 829 to mount table array 802, and thereby permits location of mount table 801 for process 102 to which user structure 403 belongs.

Mount table array 802 contains an element (MTE) 803 for each old path name to which a new path name or file descriptor has been bound. A given mount table entry 803 contains two pointers. Pointer 805 is to a file channel data structure 419 which represents the file specified by the old path name. In the context of mount table 801, such data structures 419 are termed left-hand channels (LCHAN) 802. Pointer 807 is to a mount structure 809. Each mount structure 809 represents the results of one bind or mount operation. The contents of a mount structure 809 include the following:

reference field (REF) 811: This indicates whether left-hand channels other than the one pointed to by mount table entry 803 are using the mount structure;

termination field 813: this indicates whether mount structure 809 is the last in a list of mount structures 809 which define a union directory;

mount identifier field 815: this is a unique identifier for this mount structure 809 and thus for the results of the bind or mount operation represented by mount structure 809;

pointer 817: if mount structure 809 is part of a list of mount structures 809 defining a union directory and is not the last mount structure 809 on the list, pointer 817 points to the next mount structure on the list;

pointer 819: this pointer points to a file channel 419 which represents the file identified by the new path name (or in the case of mount, by the file descriptor); in the mount table context, such a file channel is termed a right-hand channel (RCHAN) 804.

As may be seen by the foregoing, each mount table entry 803 establishes a relationship between a left-hand channel 802 and one or more right-hand channels 804. Additionally, in any file channel 419 which represents a file whose path name's meaning has been altered because of a mount or bind operation, mount ptr field 327 points to mount structure 809 representing the mount or bind operation and mount identifier field 329 contains the mount identifier 815 for that mount structure 809. Furthermore, any file channel 419 which represents a file provided by a protocol server 209 includes a pointer in field 337 to protocol channel 517 for the connection to the protocol service 209 providing the file.

FIG. 8 also illustrates how mount table 801 permits implementation of the replace, before, and after options of the "mount" and "bind" functions. With the replace option, the mount structure 809 which points to right channel 804 representing the new path name simply replaces any list of mount structures 809; the before option adds the mount structure 809 to the head of any list of mount structures 809; an error results if there is no list of mount structures 809. With the after option, the mount structure 809 is added to the end of the list; again, an error results if there is no list. When a union directory is searched, the search begins with the directory represented by right-hand channel 804 pointed to by the first mount structure 809 in the list; the next directory to be searched is the directory represented by the right-hand channel 804 pointed to by the second mount structure 809 in the list, and so forth. Thus, if left-hand channel 802(*a*)represents the path name /M and the right-hand channel 804(*a*) represents a first root directory from a service 123 bound to /M and the right hand channel 804(*b*) represents a second root directory from a second service 123 bound to /M, then a file locator function such as "chdir("/M/.")" will result in a search for "O" first in the first root directory and if it is not found there, then in the second root directory.

As previously mentioned, a new name space 115 for a process 102 is created whenever the process 102 executes a "forkpgrp" system call; "forkpgrp" takes a single argument; if the argument has any value other than 0, the existing name space for the process 102 executing forkgrp is not to be copied into the new name space 115; if the argument has the value 0, the existing name space is to be copied When "forkgrp" is executed with a non- "0" argument, forkgrp simply makes a new process group structure 827 and a new mount table array 802 for process 102; the mount table entries 803 are then created as required for the bind and mount operations which define the new name space 115. If forkpgrp is executed with an "0" argument, mount table array entries 803 in the mount table array 802 for the process 102 executing the "forkpgrp" system call are copied into the new mount table array 802; when this is done, ref field 307 in each left-hand channel 802 pointed to by a given mount table entry 803 and ref field 811 in each mount structure 809 pointed to by that entry is incremented. As may be seen from the foregoing, the implementation of mount table 801 in a preferred embodiment is such that the creation of a new name space 105 for a process is a relatively efficient and inexpensive operation.

FIG. 9 shows the entire mount table 901 for file tree 617. In the figure, channel structures 301 are represented by long oblongs; the label on a channel structure 301 indicates the path name of the file represented by the channel 301. The first mount array entry 803(*b*) records the results of the bind and mount operations on the root, "/". LCHAN 802(*b*) representing the root, "/", is connected via entry 803(*b*) and two mount structures 809(*c*) and 809(*d*) to two right-hand channels, one, 804(*c*), for the root of the file tree provided by the kernel root service, and one, 804(*d*), for the root of the file tree provided by the protocol service 209 to which #M1 is connected. A tachart pointer 337 in right-hand channel 804(*d*) points to protocol channel 517 representing the connection to the root.

The second mount array entry 803(*c*) records the results of the bind operations on #/bin, represented by left-hand channel 802(*c*). Channel 802(*c*) is connected to two right-hand channels, 804(*e*), representing #M1/68020/bin, and 804(*f*), representing #M1/lib/rc. Since the files represented by the right-hand channels 804(*d*) and (*e*) are provided by the protocol service 209 to which #M1 is connected, both right-hand channels contain mchan pointers 337 to protocol channel 517 which provides the connection to service 209. Further, the path name #/bin of the file represented by left-hand channel 802(*c*) includes the path name #/. That directory file is represented by right-hand channel 804(*c*), and consequently, left-hand channel 802(*c*)'s mount pointer field 327 contains a pointer to mount structure 809(*c*) which points to right-hand channel 804(*c*).

As may be seen from the remainder of mount table 901, every file channel 419 in mount table 901 which represents a path name which includes a component which is represented by a right-hand channel 804 includes a pointer in mount pointer field 327 to mount structure 809 which points to the right-hand channel 804 which represents the component. Thus, left-hand channels 802(*c*), 802(*d*), and 802(*e*), all of which represent files with path names including #/, all point to mount structure 809(*c*), while right-hand channels 804(*e*) and 804(*f*), both of which represent files with path names including #M1, all point to mount structure 809(*d*). Of course, when mount pointer field 327 points to a mount structure 809, mount id field 329 in the channel 301 is set to the mount identifier for the mount structure 809.

The remaining entries 803(*d*) and 803(*e*) record bindings of built-in kernel services to the "stub" directories "dev" and "fd" provided by the kernel root service #/. In these cases, each entry 803 relates the left-hand channel 802 representing the stub directory to the right-hand channel 804 representing the built-in kernel service. Since the built-in kernel services are not protocol services, the righthand channels have no pointers to protocol channels 517.

Figure 10:
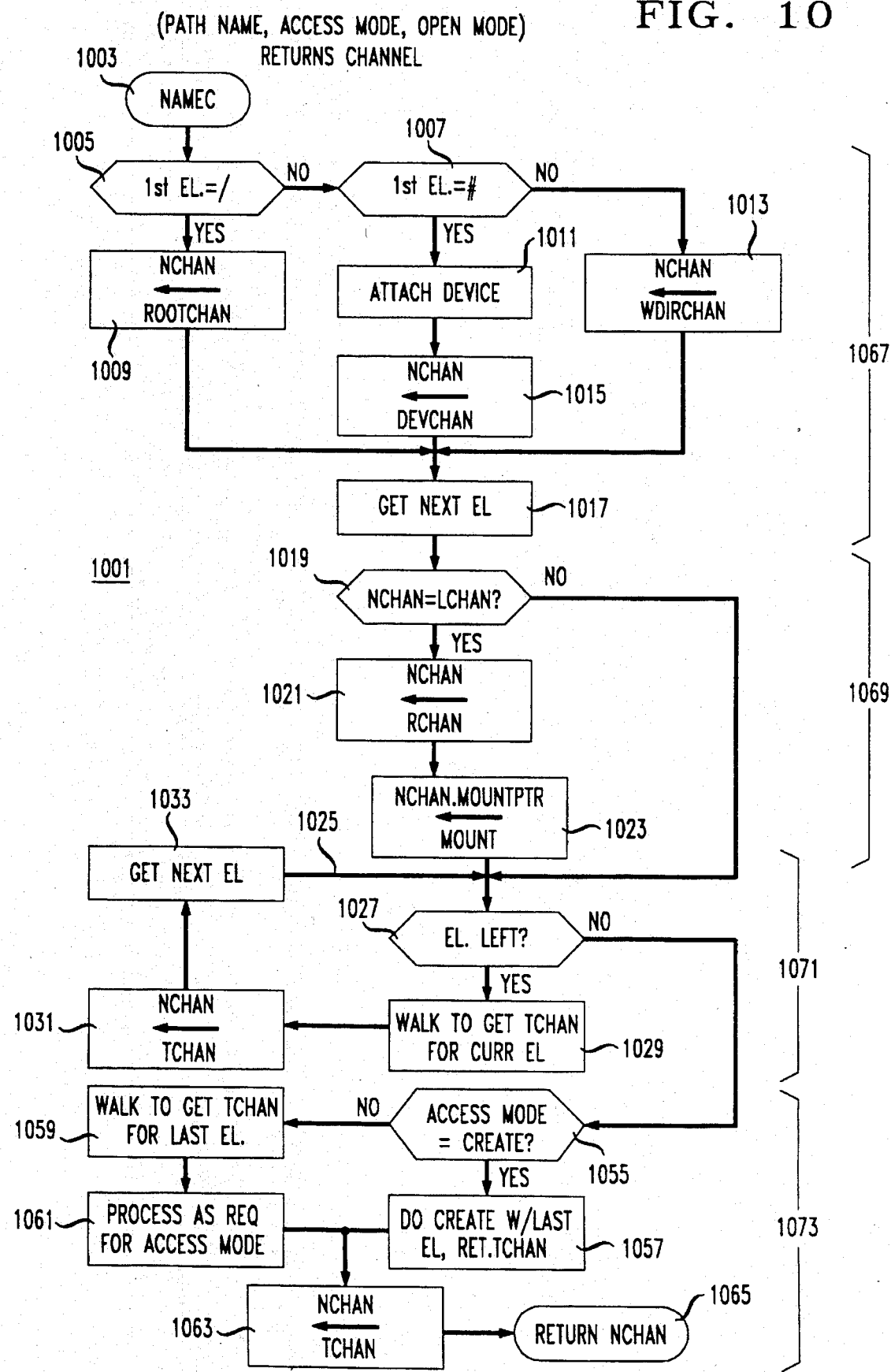
FIG. 10 is a flow chart of the namec function in a preferred embodiment.
Figure 11:
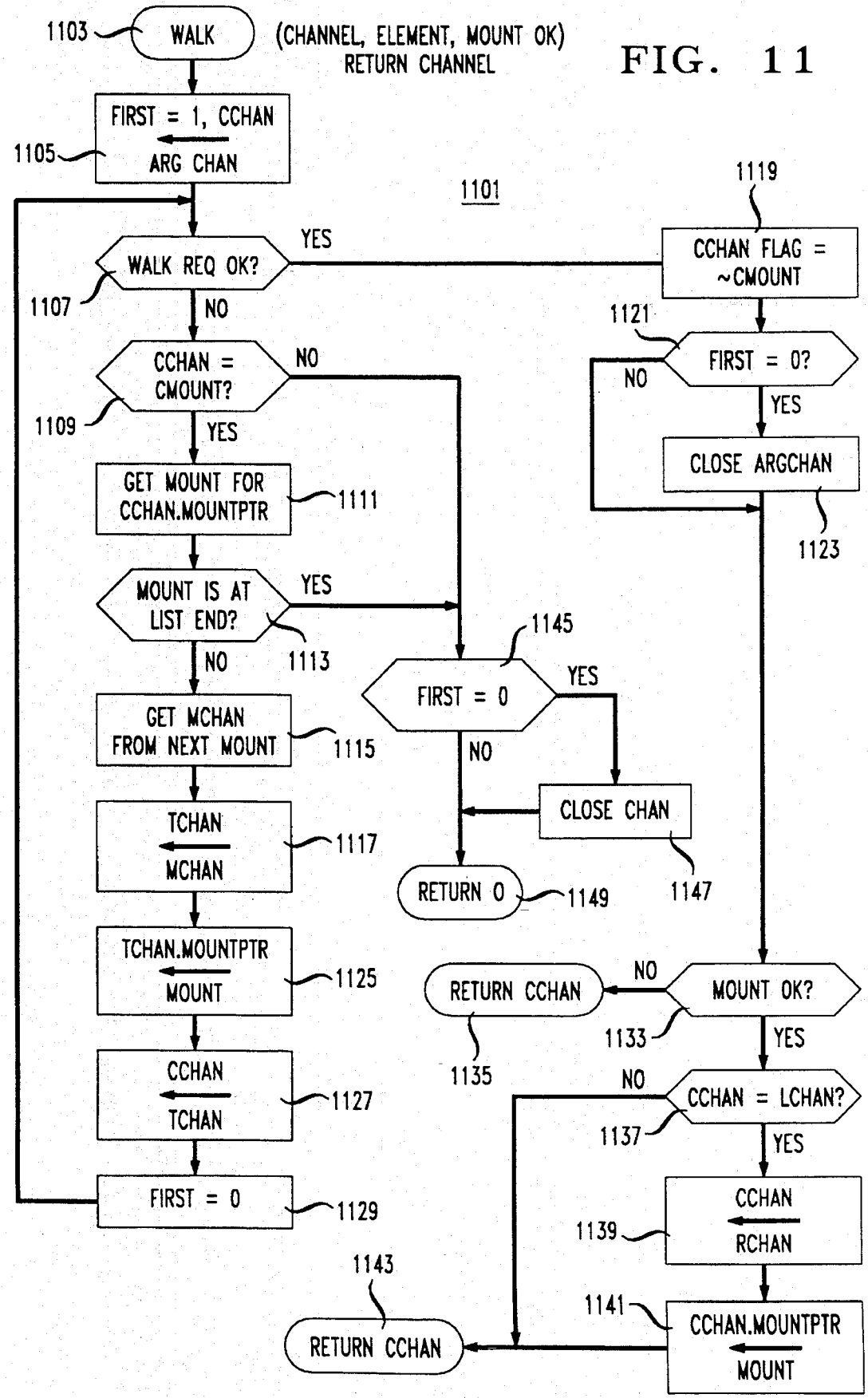
FIG. 11 is a flow chart of the walk function in a preferred environment.

Resolving Path names in Name Space 115: FIGS. 10 and 11

As already pointed out, mount table 801 takes advantage of the fact that every Plan 9 file channel 419 implicitly represents the path name of the the file represented by the file channel 419. When the Plan 9 operating system is presented with a path name in a file locator function such as "bind", "mount", "chdir", or "open", it resolves the path name by obtaining a file channel 419 representing the file specified by the path name and returning a pointer to the file channel 419. Since a process 102's file tree 117 is made up of file trees provided by services 123, the resolution of a path name involves both mount table 801 and the service requests which each service 123 responds to. The specific service requests are the walk service file locator request and in some cases the attach service file locator request.

The Plan 9 kernel function which resolves path names is termed "namec" (for name to channel). A flow chart for the function appears in FIG. 10. As shown at call oval 1003, namec takes as arguments a path name, a code for the kind of file access required by the system call which uses namec, and a code indicating how a file being opened by namec is to be opened. namec returns a pointer to a channel. namec handles the first character in the path name specially, but otherwise treats the path name as a list of names separated by "/" characters. Each of the names is termed an element.

The first part of namec (1067) obtains a channel 301 which represents the point at which the path name begins. The manner in which the channel is obtained depends on how the path name begins. There are three possibilities:

If the path name is a full path name, it begins with "/";

If the path name specifies a file provided by a built-in kernel service and the service has not yet been bound to another file name, the path name begins with "#";

If the path name begins at the working directory, the path name begins with a file name.

If the path name begins with "/", branch y of decision block 1005 is taken and the contents of the file channel 419 for the root are copied to a channel 301 "nchan" (1009). As previously indicated, the root file channel 419 can be located from user data structure 403 for the process.

If the path name begins with anything else, the n branch of block 1005 is taken and the first element is then tested at block 1007 to determine whether it is "#". If it is, an attach service file locator request is executed by the kernel built-in service specified by the character following the "#". The result of the attach locator request is a channel 301 which represents the root of a file tree 125 provided by the built-in service. The manner in which a given service handles the attach request depends of course on the service. For example, the attach function for the root service invokes a generic attach function, devattach, which takes the name of the built-in service as an argument, in this case, "/". devattach gets a new channel data structure 301, sets qid field 323 to the value specifying the root, and sets type field 315 to a value derived from the "/" argument. If the first element is neither "/" nor "#", the path name begins at the working directory, and as shown in block 1013, the file channel 419 representing the working directory is copied to nchan. That file channel can of course be located from user data structure 403 for the process.

The next stage, indicated by 1069, is finding out whether the path name for the file represented by nchan has been used as the old path name in a bind or mount function call. First, the next element in the path name is obtained. The function that does this sets the field ELEM 405 in user 403 to the file name which is the next element. Thereupon, mount table array 802 for the process group 103 is located from user data structure 403 for process 102. The left-hand channel 802 for each mount table entry 803 is compared with nchan in turn, until one is found that is "equal" to nchan. "Equal" in this contexts means that the two channels 301 represent the same file in the same service 123, i.e., that they have equal values in their type fields 313, their dev fields 315, and their qid fields 323.

If such a left-hand channel 802 is not found, the n branch of decision block 1019 is taken; otherwise, the y branch is taken, and the contents of right-hand channel 804 pointed by by entry 803 whose left-hand channel 802 is equal to nchan are copied to nchan (1021); thereupon mountptr field 327 in nchan is set to point to mount 809 which points to right-hand channel 804 and mountid field 329 is set to the value of mount 809's mountid. Thus, if the path name has been used as the old path name in a bind or mount call, nchan now represents the file represented by right-hand channel 804. Otherwise, it is unchanged.

Continuing with FIG. 10B, portion 1071 of namec consists of a loop 1025 which examines each remaining element in the path name. Each time through the loop, a call to a "walk" kernel function is made. The arguments used in the call are nchan, the current element (block 1029), and a flag indicating whether the current name can have a left-hand channel 802 representing its file (this is impossible only in the case of kernel built-in service names). As will be explained in more detail below, the walk function returns a channel 301 which represents the file specified by the element. That channel, termed tchan in FIG. 10, is assigned to nchan, as shown by block 1031; then, the next element is obtained from the path name (block 1033). As before, ELEM field 405 in USER structure 403 is set to the next element. When the loop is finished, the last element of the path name remains to be processed.

The manner in which the last element is processed depends on which system call invoked namec. If it was a create system call, the last element represents the name of the new file; otherwise, it represents the file to be accessed. Which system call invoked namec is indicated by the access mode argument, and as shown in decision block 1055, further processing depends on that argument. For purposes of the present discussion, it need only be noted, as shown in block 1057, that when the access mode argument indicates that a file is to be created, a create service file request is made using the last element and tchan, which at this point is a copy of the file channel 419 for the directory in which the new file is to be created. tchan consequently contains values in its type field 313 and its dev field 315 which specify the service 123 which contains the directory and the qid for the directory in its qid field 323. As a result of the create service file request, the new file is created and assigned the last element as its name and tchan's qid field is set to the qid of the new file (1057).

Otherwise, the last element represents the name of a file which already exists. In this case, the walk function is invoked again using the last element to obtain tchan, which represents the file referred to by the last element (1059). Thereupon, fields in tchan are set as required by the access mode and open mode arguments of namec (1061) and tchan is copied to nchan (1063). As shown in return oval 1065, nchan is then returned as the channel 301 representing the file specified in the path name argument.

FIG. 11 is a flow chart of the walk function. As is apparent from start oval 1103 of FIG. 11, walk takes a channel data structure 301, an element of a path name, and a flag indicating whether a mount on the element is legal. The channel data structure 301 represents a directory to be searched for a file having the element name. If the element name is found in the directory or a directory which is unioned with the directory represented by the channel data structure, the function returns a channel data structure 301 which represents the file specified by the element of the path name.

In overview, the algorithm is the following: First, a walk file service request is made to the service specified by type 313 and device 3 15 fields of channel 301 used as an argument. The walk file service request includes the element used as an argument. If the file service request succeeds, it returns a channel 301 for the file specified by the element; thereupon a check is made of mount table 308 to determine whether the channel 321 returned by the walk request is a left-hand channel 802; if it is not, the channel returned by the walk request is returned by the walk function; if it is, the right-hand channel 804 corresponding to the left-hand channel 802 is copied into the channel 301 to be returned by the walk function and the mount ptr and mountid fields of the channel 301 are set as required for the mount data structure 809 pointed to by the mount array element 803 which points to left-hand channel 802.

The walk file service request does not succeed if the file service cannot find a file having the name specified by the element in the directory specified by the channel. There are two reasons why this might be the case:

the directory has had another name bound to it; or the file corresponding to the element does not exist in the directory.

In the first case, mount ptr 327 and mount id 329 specify mount structure 809 created when the other name was bound, and the walk service file locator request is attempted again with the service specified in right-hand channel 804 pointed to by mount structure 809. If the walk file service request succeeds, processing continues as indicated above. If it fails, either of the above possibilities may again hold. Assuming this time that the problem is that the file corresponding to the element does not exist in the directory, there are still two possibilities: that the file in fact does not exist, or that the directory which was searched is part of a union directory and other directories which are pan of the union directory remain to be searched. If the file in fact does not exist, term field 813 in mount structure 809 for the directory which was just searched will indicate that mount structure 809 is the last one in the list of mount structures 809 making up the union directory; if not, next field 817 in mount structure 809 will point to the mount structure 809 for the next directory in the union directory, and from that next mount structure, the right-hand channel 804 to be searched can be determined. In this case, the walk service file locator request is repeated using the right-hand channel 804 pointed to by the next mount structure.

In more detail, in block 1105, a flag first, indicating that it is the first time the service file locator request will be done, is set, and the channel provided as an argument is copied into cchan. In block 1107, the walk service file locator request is performed using cchan and the element. The action which the service performs in response to the request depends on the service. Two examples may suffice here. The root service responds to the walk request by determining whether cchan has a special value in qid field 323 which is reserved for the root of the root service and if it does, whether the element is one of the names which the root service provides as "stubs". If the latter is the case, cchan's qid field 323 is set to the special value reserved for that stub name; otherwise, the walk service locator request fails.

Mount service 203 responds to the walk request as follows: as previously mentioned, part of der field 315 of channels 301 representing files provided by protocol services 209 contains an identifier specifying a mount service array entry 503. Using that identifier, mount service 203 locates mount service queue 509 for the protocol channel 517 for the protocol service 209; allocates a mount header 521 for the tmessage required for the walk service locator request, and places the file identifier from the channel and the element in the treessage. If the protocol service 209 has a file with the name specified by the element in the directory specified by the file identifier from the channel, it returns an message containing a qid for the file, and that qid is placed in qid field 323 of cchan.

If the walk request succeeds, flag 321 in cchan is set to indicate that the channel 301 is not the result of a mount or bind operation (1119). The next step is to determine whether the walk request has been done more than once (1121). If that is the case, the channel received as an argument will not be the one returned, and the channel received as an argument may be closed (1123). The close operation decrements the count in the channel's ref field, and if the ref field then has the value 0, sends a clunk service request to the service indicated by the channel's dev field 315 and returns the channel structure 301 to the free list. If it's still the first time that the walk request has been made, that step ks skipped. The next step (*decision* block 1133) is to determine whether cchan represents a component of a pathname which may have another component mounted on it. This is true for any component other than "#" and is indicated by the "mountok" argument of walk. If there can be no mounted component, there is no need to look in mount table 801, and cchan is returned as it is (1135). Otherwise, mount table 801 is examined for a left-hand channel 802 which is equal to cchan, and if such a left-hand channel 802 is found, the value of right-hand channel 804 corresponding to left-hand channel 802 is copied into cchan, along with the mount ptr and the mount identifier for mount structure 809 pointing to the right-hand channel 804. cchan is the returned as thus modified (blocks 1137 to 1143).

Returning to walk service request block 1107, if the request fails, the first step is to determine whether cchan is the result of a mount or bind request. If it is, the search has failed and as may be seen at connector "B", the walk function returns 0, indicating failure (oval 1149). As shown in blocks 1145 and 1147, if the walk request has been done more than once, cchan is closed. Next, the value in cchan's mount ptr field 327 is used to locate a mount structure 809 (block 111). If the mount structure 809's term field 813 indicates that the mount structure is at the end of the list of mount structures 809 defining a union directory, the search has failed, and walk ends as shown at connector B. Otherwise, the pointer next 817 in the current mount structure 809 is followed and the right-hand channel 804 pointed to by the next mount structure 809 is copied into a temporary channel, tchan (block 1115). The mount ptr 327 field in tchan is then set to point to the next mount structure (block 1125), tchan is copied to cchan (1127), first is set to 0, and as shown by the connector "D", the walk service request in block 1107 is repeated. As indicated above, the loop 1131 defined by connector D is repeated until either the walk request in block 1107 succeeds or it is clear that the file corresponding to the element has not been found.

Implementing File Locator Operations

Once name resolution in Plan 9 is understood, the implementation of file locator system calls such as "open", "bind", and "mount" is straightforward. Beginning with open, the system call takes a path name and an integer specifying a mode of opening as argument and returns a file descriptor 417 for the opened file. The system call first locates an element 415 in file descriptor array 413 which does not presently point to a channel 301; the number of that element is the file descriptor for the newly-opened file. Then the system call invokes namec. The arguments are the path name, an access mode specifier specifying open, and the mode of opening. As indicated above, namec resolves the path name, specifies that the service indicated by the path name performs an operation on the file specified by the path name, and returns a channel 301 with fields set such that the channel 301 is now a file channel 419 representing the file. The open system call places a pointer to the file channel 419 in the file descriptor array element 415 specified by the file descriptor and returns the file descriptor.

The "bind" system call in a preferred embodiment takes as arguments a pointer to the new pathname, a pointer to the old path name, and a flag indicating whether the bind is being done with the replace, before, or after options. It returns an integer which has the value "1" if the bind succeeded and "0" if it did not. The system call calls a kernel function called "bindmount" which does both binds and mounts. A flag provided by the "bind" or "mount" system call indicates which is to be done. When a "bind" system call is indicated, bindmount calls namec with the first path name to obtain a first channel 301 representing the file specified by the first path name. Then it calls namec with the second path name to obtain a second channel 301 representing the file specified by the second path name. The next step is to call a kernel mount function. The function rearranges mount table 801 as required for the bind operation.

Figure 12:
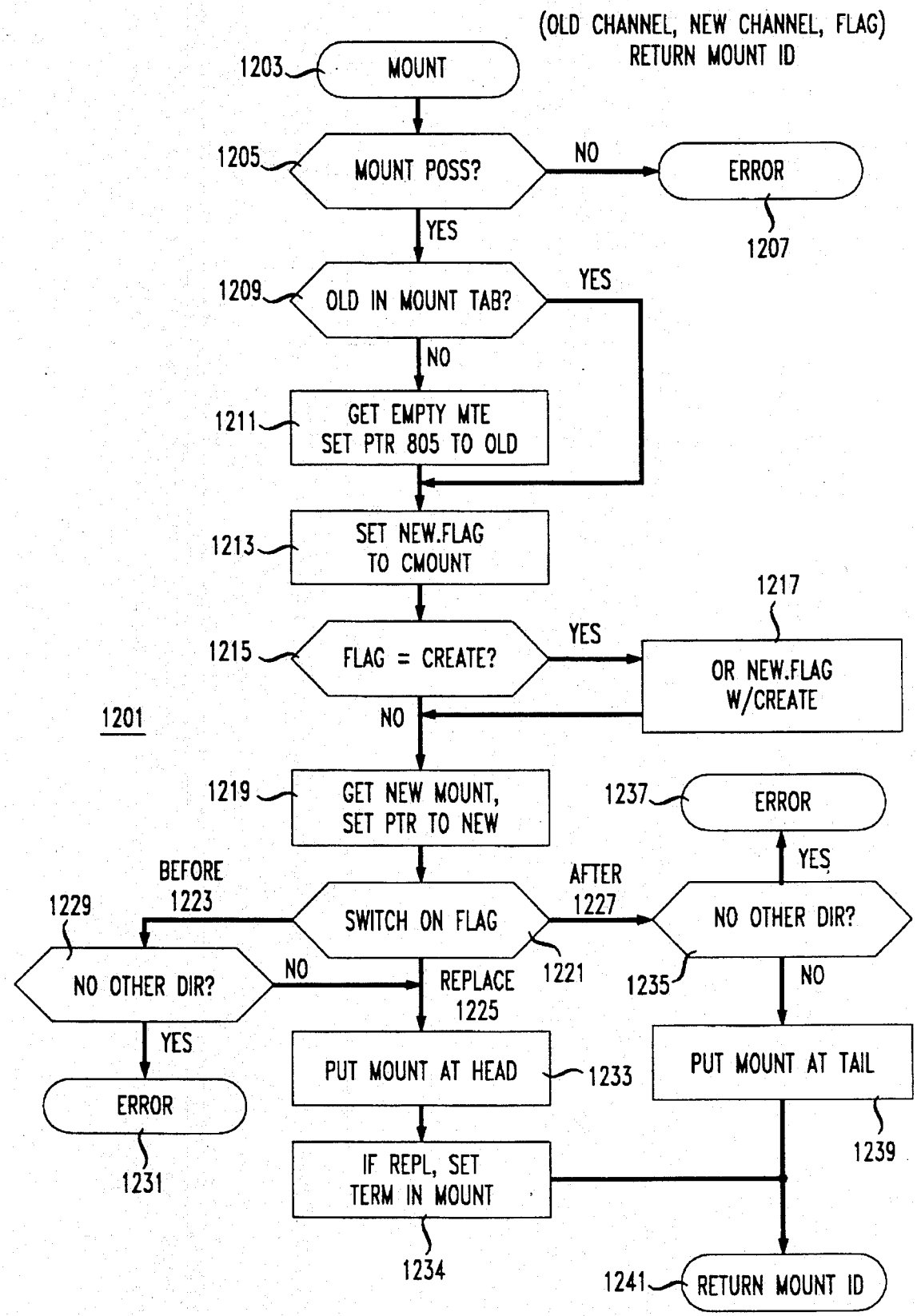
FIG. 12 is a flow chart of the mount function in a preferred environment.

FIG. 12 is a flow chart of the kernel mount function. As shown at oblong 1203, the function takes the old channel, the new channel, and a flag as arguments, and returns the mount id of mount structure 809 resulting from the bind or mount. The flag is set from the options flag of the bind or mount system call. In the present case, the actual argument for the old channel is first channel 301, and the actual argument for the new channel is second channel 301.

The first step in the algorithm is to determine whether the bind or mount operation can be performed on the channels 301 received as arguments (1205). The operation is not permitted if both channels specify the same file (i.e., have the same qid 323) or if the old channel represents a file which is not a directory and the flag specifies an option other than replace. When the operation is not permitted, an error results, as indicated in 1207. The next step is to search mount table 80 1 as already described to determine whether old channel 301 is equal to a left-hand channel 802 which is already in mount table 801. If it is, no new mount table entry 803 is required, and block 1211 can be skipped. If not, block 1211 obtains an empty mount table entry 803 and sets pointer 805 in that entry 803 to point to the old channel.

Next, flag field 321 in new channel 301 is set to indicate CMOUNT, indicating that it is a right-hand channel 804 (1213). Flag field 321 may also indicate a CREATE option, which specifies that files may be created in the directory represented by right-hand channel 804. When that option is specified, flag field 321 in new channel 301 is set to indicate the CREATE option as well as CMOUNT (1215,1217). Thereupon, the mount function gets a new mount structure 809 to link the mount table entry for the left-hand channel 802 corresponding to the old channel with the right-hand channel 804 being made from new channel 301. Pointer 819 in the new mount structure is set to point to new channel 301 (1219).

Following connector "A", it may be seen that the next step is a switch statement 1221 which specifies one of three paths, depending on whether the flag argument indicates the replace, before, or after option. With before path 1223, a check is made at 1221 to determine whether another directory has already been bound to left-hand channel 802; if not, no union directory is possible and the before option is in error (1231). If such a directory already exists, processing continues as for replace option 1225. In that option, the new mount structure 809 is put at the head of the list of mount structures 809 corresponding to left-hand channel 802 equivalent to old channel 301 (1233). If replace option 1225 is being exercised, term 813 in the new mount structure is set to indicate the end of the list (1234). In after option 1227, finally, a check is again made at 1235 to determine whether a union directory is possible, and if not, error 1237 results. Otherwise, as shown in block 1239, the new mount structure 809 is put at the tail of the list of mount structures 809. mount then returns mount identifier 815 belonging to the new mount structure 809. Continuing with bindmount, that function finishes by closing the old and new channels 301, returning whichever of them was not added to the mount table and is not otherwise in use to the list of free channels.

The system mount function call differs from the system bind function call in that there is no new path name argument. Instead, that argument is replaced by an argument which is a file descriptor 417 which represents an open protocol channel 517. The manner in which such a file descriptor 417 is obtained will be described in more detail below. Additionally, the system mount function call includes an argument which consists of data which is passed through to the protocol service 209 being mounted. In response to the flag, bindmount first uses file descriptor 417 and file descriptor array 413 to locate the protocol channel 517 specified by the file descriptor argument.

Next, a mount service attach operation is performed using the protocol channel 517. The first thing done in the attach operation is to locate an unused mount service array element 503. That done, the generic devattach operation previously described above is performed, except that the argument used to invoke it is "M", specifying mount service 203. devattach returns a channel structure 301 with its type field 313 field set to specify mount service 203, and the attach function for the mount service sets der field 315 in the channel to the value of the identifier for the unused mount service array element 503 and sets pointer 505 in the unused element to point to the channel structure. Next, the protocol channel argument is used to determine whether there is already a message queue, represented by a mount serviced queue structure 509, for the protocol channel 517 specified by the argument. If there is not, one is allocated. Thereupon, an attach tmessage is sent which contains the file identifier for the channel 301 returned by devattach and the argument which was to be passed on to the protocol service 209. When the rmessage returns, it contains a qid for the root of file tree 125 in the protocol service 209. The qid is copied into the qid field 323 and mqid field 339 of the channel 301 returned by devattach, and a pointer to protocol channel 517 to which the message queue belongs is copied to pchan field 337. The channel resulting from the mount service attach operation is then provided as the new channel 301 argument to the mount function. When mount is specified for the bindmount function, bindmount finishes by closing protocol channel 517 from file descriptor array 413 and removing it from file descriptor array 413.

Figure 13:
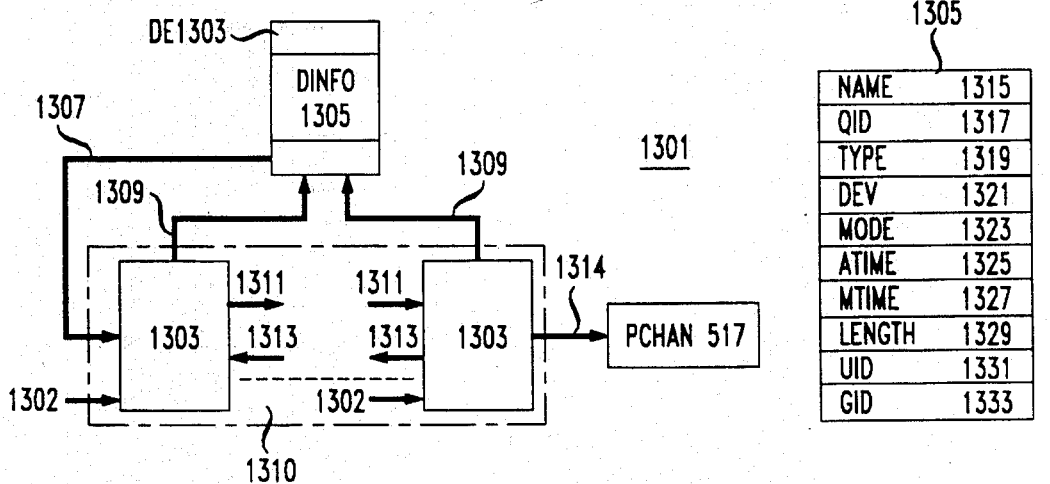
FIG. 13 is a diagram of the data structures used to register a protocol service in a preferred embodiment.

Obtaining an Open Protocol Channel 517: FIG. 13

The arguments for the mount system call include a file descriptor 417 for an open protocol channel 517. The protocol channel 517 is a channel 301 which represents a file which is a connection to a protocol service 209. In a preferred embodiment, the connection may either be a file in a pipe by which a local protocol service 211 sends and receives messages or a file which represents a conversation via a communications system with a remote protocol service 213. In a preferred embodiment, file descriptors for the files in a pipe are provided by the "pipe" system call which creates the pipe. File descriptors for files representing a conversation via a communications system are obtained as follows: first, a "dial" function is invoked. The function returns the path name of the directory which contains the file representing the conversation. Then the path name of the file representing the conversation is used in an "open" function, and the open function returns the file descriptor for the file representing the conversation.

A protocol channel 517 may be made available for general use by processes 102 by registering the protocol service 209 for which protocol channel 517 represents the connection in srv 615. As is the case with all services, srv 615 presents the resources it manages as files; consequently, to register a protocol service 209 in srv 615, one creates a file representing the protocol service 209 in the directory represented by srv and then writes the file descriptor for the file representing the connection to the created file.

Of course, the invocation of the system create function results in a create file request to srv, and srv responds to the create request by making a directory entry for the file and placing a qid for the directory entry in field 323 of the channel 301 for the created file and a pointer to the directory entry in auxiliary field 333. The invocation of the system write operation similarly results in a write file request to srv, and srv responds to the write request by placing a pointer to the protocol channel 517 specified by the file descriptor in the directory entry for the protocol service 209. When the open system call is made using the name of the file representing the protocol service 209, the resulting open file request to srv 615 results in srv 615 returning protocol channel 517 for the protocol service 209. Open then provides protocol channel 517 with a file descriptor 417 as already described, and that file descriptor 417 may be used in the mount system call.

FIG. 13 shows data structures 1301 employed by srv service 615 to register a protocol service 209. The directory maintained by srv 615 is made up of a tree of directory entries 1303. Each directory entry 1303 contains directory information 1305 and a number of pointers. The pointers organize directory entries 1303 into a tree. There may be one or more directory entries 1303 at each level of the tree and an entry 1303 at a given level may either be an interior node, i.e., point to the next lower level of the tree, or a leaf node representing a protocol service 209. Interior nodes are termed hereinafter "parents". Entries 1303 having a given parent are connected into a child list 1310 by next pointers 1311 and back pointers 1313; additionally, each entry 1303 in a given child list 1310 has a pointer 1309 to its parent entry 1303. Parent entries 1303 further have a pointer 1307 to the first entry 1303 in child list 1310. Led nodes may have a pointer 1314 to protocol channel 517 representing the connection to protocol service 209 represented by the leaf node. Additionally, when an entry 1303 is represented by a channel 301, aux field 333 in that channel 301 contains a pointer 1302 to entry 1303 represented by the channel.

Directory information 1305 contains the following fields:

- name 1315: the name used to identify protocol service 209 when it is registered;
- qid 1317: the qid which represents directory entry 1303 in channels 301 representing that directory;
- type 1319 and dev 1321: these specify srv 615;
- mode 1323: set when the directory represented by entry 1303 is opened to indicate the open mode;
- atime 1325: indicates when entry 1303 was allocated;
- mtime 1327: indicates when entry 1303's parent was allocated, or if entry 1303 is a parent, the latest time when a child was created;

length 1329: if entry 1303 is a parent, indicates the number of child entries 1303; and uid 1331: a string value naming the user who owns the entry 1303; and gid 1333: a string value identifying a group to which the user identified in uid 1331 belongs.

The foregoing has shown in detail how the Plan 9 operating system implements a per-process name space, how the name space may be modified by means of bind and mount operations, how the name space may be employed to locate files, and how file operations may be performed on the files thus located. In the following, two particularly advantageous uses for the per-process name space will be explored.

Figure 14:
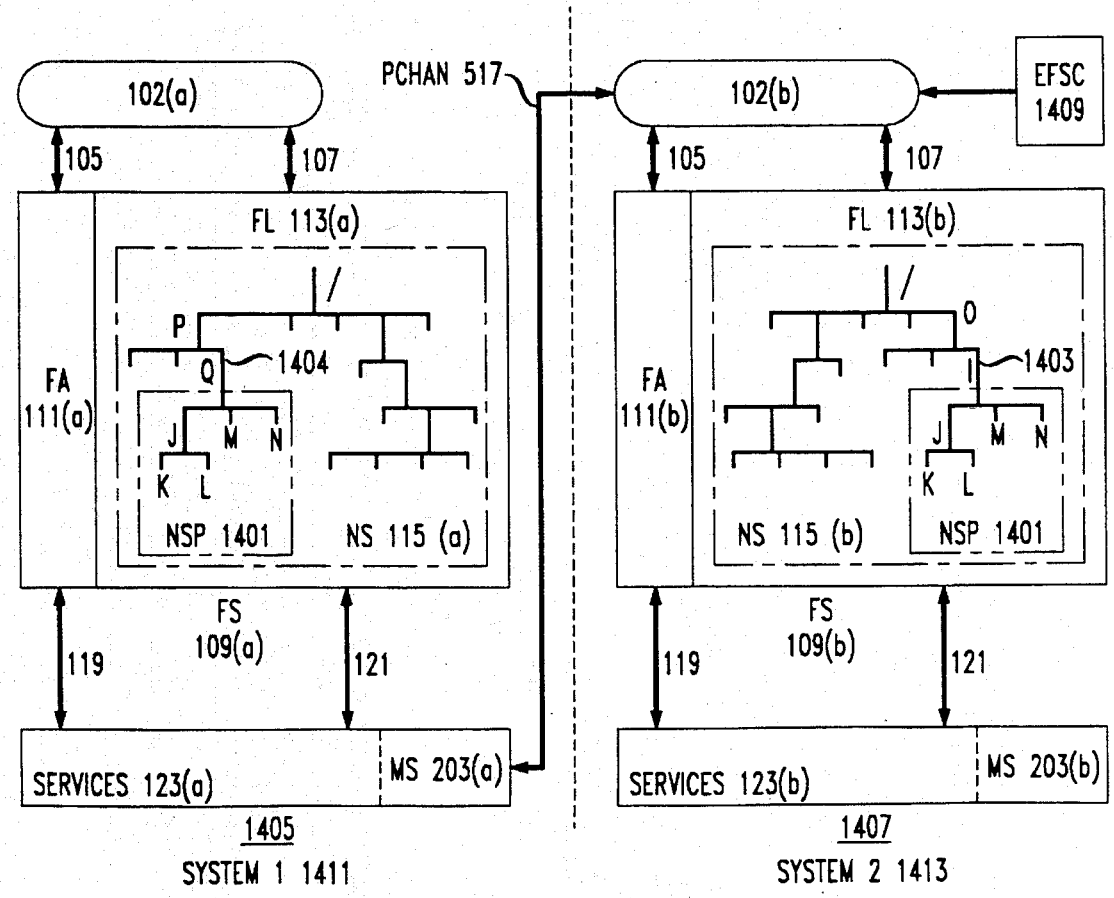
FIG. 14 is a diagram of a first process which has provided a portion of its name space to a second process.

Overview of Export Flies Service or exportfs: FIG. 14

In Plan 9 as described in the foregoing portions of the Specification, a service 123 can only provide an entire tree of files for mounting in a process 102's name space 115 (see the section "Overview of the Architecture of Plan 9 Services" above). The improvements described in the following provide a service 123 which provides a portion of one process 102's name space 115 to be mounted in another process 102's namespace. The new service 103 will be termed herein "export files service" or exportfs.

FIG. 14 shows the relationship of two processes 102 when one process, 102(b), is exporting a portion (NSP) 1401 of its namespace 115(b) to process 102(a), which has mounted the portion in its namespace 115(a). As described in the preceding sections "Overview of the Architecture of Plan 9 Services" and "Kernel Services and Protocol Services" and shown in FIGS. 1 and 2, plan 9 file system 109 has a file access component 111 which performs file access operations 111 in response to file access function calls 105 from a process 102 and a file location component 113 which performs file location operations 107 in response to file locator function calls 107 from the process 102. The file access function calls 105 specify the file to be accessed by means of a file descriptor 417 which is a small integer specifying a channel data structure 301 representing the file being accessed; the file locator function calls specify the file to be located by means of a path name.

In Plan 9, the files are provided by a number of services 123; when file system 109 receives a file operation function call from a process 102, it translates the function call into a service file operation request for the service 123 which provides the file. As with the functions, there are two class of operation requests: service file access requests 119 and service file locator requests 121. All services 103 must be able to handle the set of service file operations described in the "Overview of the Architecture of Plan 9 Services".

Many services 103 provide the service file operations in response to the Plan 9 protocols described in "Kernel Services and Protocol Services" above. Such services are termed protocol services 209. The protocols may be transferred between the process and the protocol service by means of interprocess communications or by means of messages across a network. The translations between service file operation requests and Plan 9 protocols are managed by mount service 203. A channel for carrying plan 9 protocols between mount service 203 and a protocol service 209 is termed a protocol channel 517.

File locator component 113 of file system 109 organizes the files currently available to process 102(a) into a name space 115 in which the files are organized by file name into a single tree of files. Name space 115 can by modified by means of the Plan 9 "bind" and "mount" function calls. The "bind" function call changes the relationships of names already in the name space 115 to each other; the "mount" function call makes a name which is already in the name space equivalent to the root of a file tree 117 provided by a service 123. Mount thus adds the file tree provided by the service to the process's name space 115.

As shown in FIG. 14, the reference number 1405 specifies importing process 102(a), its file system 109(a) with name space 115(a), and services 123(a) with mount service 203(a). Reference number 1407 specifies exporting process 102(b) with its file system 109(b), name space 115(b), services 123(b), and mount service 203(b). Mount service 203(a) is connected by a protocol channel 517 to process 102(b). Protocol channel 517 transfers Plan 9 protocols directly between mount service 203(a) and process 102(b). Importing process 102(a) may be executing any program whatever; exporting process 102(b) is executing export files service code 1409. When executing export files service code 1409, process 102(b) becomes exportfs, i.e., a protocol service 209 which is able to translate Plan 9 protocols specifying files in portion 1401 of name space 115(a) received via protocol channel 517 into file functions 105 and 107 specifying files in name space portion (NSP) 1401 of its name space 115(b). As a result, when process 102(a) mounts a channel corresponding to protocol channel 517 on directory P of name space 115(a), name space portion 1401 becomes part of name space 115(a).

Thus, after execution of the mount function, process 102(a) can use the path name /P/Q/J/L to locate the file specified by the path name /O/T/J/L in the name space of process 102(b). File access operations performed by process 102(a) on the file /P/Q/J/L then result in file access operations being performed on the file specified by the path name /O/I/J/L in process 102(b). When process 102(b) is executing export files service code 1409, it may provide any subtree of name space 115(b) (including all of name space 115(b)) to process 102(a) via protocol channel 517. Process 102(a) may then use the mount function to mount the subtree on any directory in name space 115(a).

In a preferred embodiment, process 102(a) and process 102(b) are executing on separate computer systems 1411 and 1413 which are connected by a communications network. The relationship between the name spaces of process 102(b) and 102(a) shown in FIG. 14 is set up as follows: First, process 102(a) uses the Plan 9 dial function to dial computer system 1413 upon which process 102(b) is to run. The arguments for the dial function include the network name of system 1413 and the name of the protocol service with which a connection is to be established, in this case, exportfs. When the dial function succeeds, it returns a file descriptor for a channel upon which process 102(a) can perform file operations on services 123 provided by system 1413. The Plan 9 protocols for the operations move via protocol channel 517.

A process called the listener on computer system 1413 responds to messages received from the network by spawning processes to execute the services specified in the messages. In this case, what is spawned is process 102(b), which executes exports tiles service code 1409. Process 102(b)'s name space 115(b) is the name space on system 1413 for the user for whom process 102(a) is executing in system 1411. In a preferred embodiment, each user of a system has a profile file which is executed whenever the user logs onto the system. When the listener spawns process 102(b), it causes process 102(b) to execute the profile file in system 1413 for the user in system 1411 for whom the dial function was executed. Bind and mount function calls in the profile file for the user then construct a namespace 115(*b*) for process 102(*b*). The profile file further contains calls which set the standard input and standard output files used by process 102(*b*) so that reads by process 102(*b*) from the standard input file are reads from protocol channel 517 and writes to the standard output file are writes to that protocol channel. With process 102(*b*)'s name space 115(*b*) and standard input and output channels have thus been set up, process 102(*b*) begins executing exports files service code 1409.

Meanwhile, process 102(*a*) performs a write operation using the channel provided by the dial function. What is written is the path name in name space 115(*b*) of the root of the file tree which is to be imported into name space 115(*a*). Thus, in the example of FIG. 14, the path name in the write operation is /O/I. Process 102(*b*) is reading the channel to which process 115(*a*) has written the path name. When process 102(*b*) receives the path name, it executes initialization code in exports file system code 1409 which effectively makes directory I 1403 the root of the file tree being provided by process 102(*b*) to process 102(*a*). This code will be described in more detail later. If the initialization succeeds, process 102(*b*) sends a confirmation message to process 102(*a*) indicating that it is ready to perform file operations on the file tree specified by process 102(*a*). Thereupon, process 102(*a*) mounts the channel it received from the dial function upon the desired directory in name space 115(*a*), in this case, directory Q 1404.

Having sent the confirmation message, process 102(*b*) enters a loop which performs read operations on the channel connecting it to process 102(*a*). Each time process 102(*a*) wishes to perform an operation on a file in name space portion 1401, it performs a function call 105 or 107 which file system 109(*a*) turns into a service file request to mount service 203(*a*), which converts the service file request into a tmessage (transmitted message) for the equivalent Plan 9 file protocol.

The tmessage is sent via protocol channel 517 to system 1413, where it is received directly by process 102(*b*). Process 102(*b*) translates the tmessage into the file function 105 or 107 required in namespace 115(*a*) to perform the operation specified in the tmessage. When the file function 105 or 107 has completed the operation, process 102(*b*) returns an rmessage via protocol channel 517 to process 102(*a*). When mount service 203(*a*) receives the rmessage, it provides its contents to file system 109(*a*) in response to the service file request which resulted in the tmessage, and file system 109(*a*) provides the contents to process 102(*a*) in response to the function call which produced the service file request. Thus, from the point of view of process 102(*a*), an operation on a file in name space portion 1401 of process 102(*b*) is no different from an operation on any other file in name space 115(*a*), and process 102(*b*) while executing export files service code 1409 in fact operates as a protocol service for the file tree in name space portion 1401.

Figure 15:
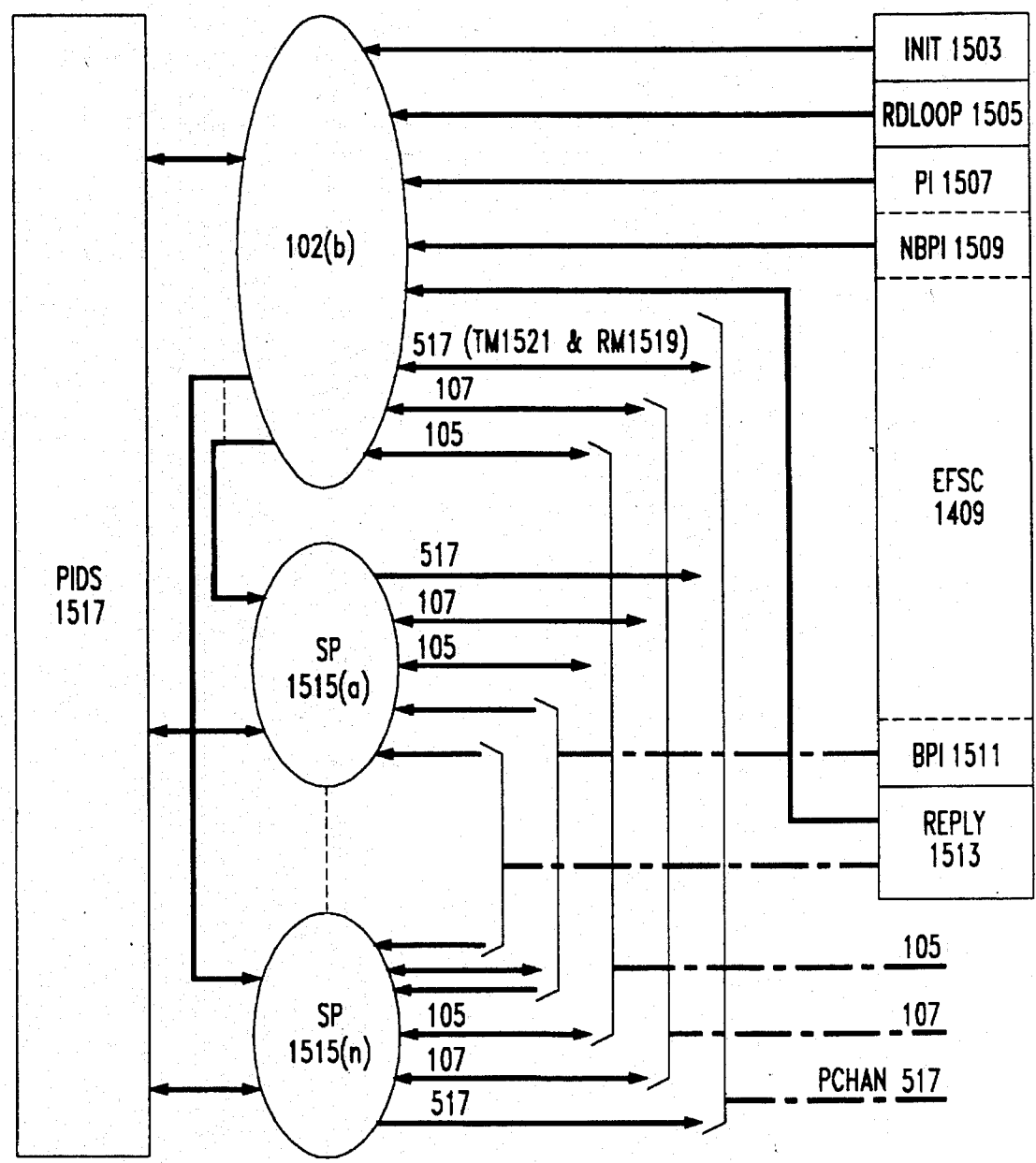
FIG. 15 is a diagram of a preferred embodiment of exportfs.

Details of exportfs: FIG. 15

FIG. 15 provides details of a preferred embodiment of exportfs protocol service 1501. The structure of exportfs protocol service 1501 is a consequence of two requirements:

that exportfs must be able to translate Plan 9 protocols based on path names as they appear in name space 115(*a*) into file function calls 105 and 107 based on path names as they appear in name space 115(*b*); and that exportfs must be non-blocking, that is, it must be able to handle a new tmessage before the file function call 105 or 109 has returned a value.

As will be explained in more detail later, the first requirement is handled by protocol interpreter data structures (PIDS) 1517, which provide a mapping between the path names for name space portion 1401 in name space 115(*a*) and the path names for name space portion 1401 in name space 115(*b*).

The second requirement is a consequence of the fact that the file access functions read, write, and open are blocking, that is, a process which executes one of these functions suspends execution until file system 109 and services 123 have actually completed the open, read, or write operation. For example, if the file being read is an input device such as a keyboard or mouse, the read operation will not be completed until the user of the input device actually inputs data. Clearly, process 102(*b*) cannot cease responding to Plan 9 protocols specifying operations on other files in same space portion 1401 because it is suspended until a user has provided data to the input device.

The problem is solved in a preferred embodiment by means of slave processes 1515. Process 102(*b*) has a set of such slave processes available to it. Each time process 102(*b*) receives a tmessage which must be translated into a blocking file access function 105, it passes off the work to be done to respond to the protocol to a slave process 1515, which translates the protocol into the proper file access function, and when the file access function has completed execution, the code executed by slave process 1515 translates the result into the appropriate rmessage and provides it to protocol channel 517.

Continuing with FIG. 15 in more detail, process 102(*b*) and the slave processes 1515 appear as circles in FIG. 15; arrows show the flow of data and instructions into and out of the processes. Dashed lines indicate child processes. The instructions come from export files service code 1409, which for purposes of the present discussion can be divided into the following components:

Initialization (INIT) 1503, which sets up protocol channel 517 and protocol interpreter data base 1517;

read loop (RDLOOP) 1503, which reads tmessages 1521 from protocol channel 517;

Protocol interpreter 1507, which translates the tmessages 1521 into file operation function calls 105 and 107. Protocol interpreter 1507 has two subcomponents:
  a. Non-blocking protocol interpreter 1509 translates all tmessages 1521 specifying non-blocking file operations into the proper file operations 105 and 107; and
  b. Blocking protocol interpreter 1511 translates read, write, and open tmessages 1521 into read, write, and open file functions 105.

Reply portion 1513 translates the results of a file operation function 105 or 107 into a rmessage 1519 and provides the rmessage to protocol channel 517.

Operation of exportfs 1501 is as follows: When process 102(*b*) begins executing code 1409, it already has name space 115(*b*) and its standard input and output are directed to protocol channel 517. The first part of code 1409] to be executed is initialization 1503. Initialization 1503 first puts process 102(*b*) into a new process group 103 of its own. As a consequence, name space 115(*b*) now belongs solely to process 102(*b*) and changes made in the name space as provided to process 102(*b*) by the listener process will not be reflected in name space 115(*b*). Further, storage for some of the components of protocol interpreter data structures 1517 is allocated.

Next, initialization 1503 reads protocol channel 517, which at this point provides process 102(*a*)'s specification of the root of the name space to be exported. Initialization 1503 then changes directories to the file specified in the specification of the root and initializes the portion of protocol interpreter data structures 1517 which does the mapping. Read loop 1505 next begins reading tmessages 1521 from protocol channel 1505. Each tmessage is placed in a buffer and the buffer is provided to protocol interpreter 1507.

If the tmessage specifies other than a read, write or open operation, process 102(*b*) executes code in non-blocking protocol interpreter 1509 which uses the information in the buffer received from read loop 1505 and information in protocol interpreter data structures 1517 to translate the information in the buffer into a file operation function call 105 or 107, which goes to file system 109(*b*) as previously described. If the tmessage specifies a read, write, or open operation, process 102(*b*) gets a slave process 1515 and passes the buffer to the slave process. The slave process 1515 then executes the code in blocking protocol interpreter 1511, using the contents of the buffer and protocol interpreter data structures 1517 to translate the information in the buffer into the read, write, or open file access function calls 105. In the preferred embodiment, the slave processes 1515 are "light-weight processes". They have their own stacks, but otherwise share name space 115(*b*) and both memory and file descriptor tables with process 102(*b*).

The code in reply 1513, finally, is executed whenever a file function call 105 or 107 returns, and is executed by the process which made the function call 105 or 107. When executed, the code simply makes an rmessage including any data returned by the call 105 or 107 and writes the rmessage to protocol channel 517.

Figure 16:
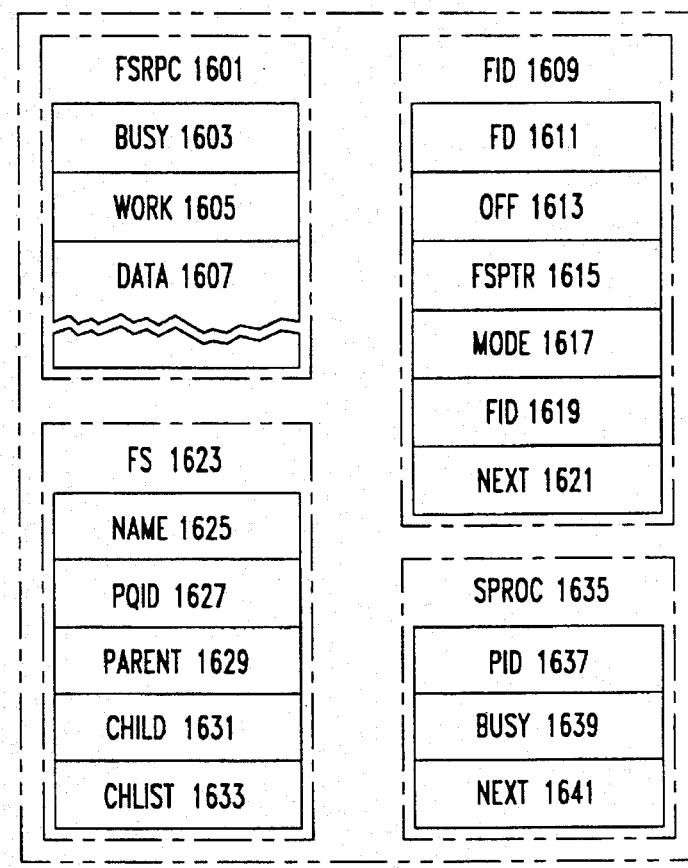
FIG. 16 is a diagram of the data structures employed in protocol interpreter data base 1517.
Figure 17:
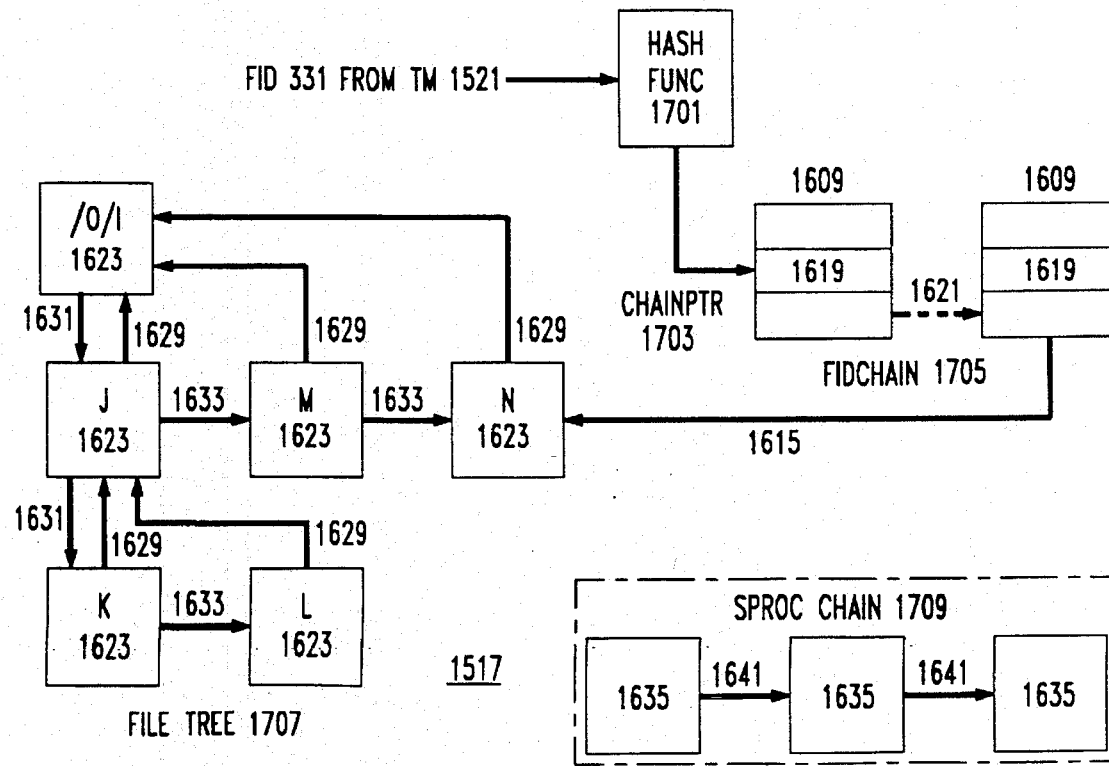
FIG. 17 is a diagram of how the data structures are combined in protocol interpreter dam structures 1517.

Details of Protocol Interpreter Data Structures 1517: FIGS. 16 and 17

The following discussion of protocol interpreter data structures 1517 will first present the main elements of data structures 1517, will then show how they are combined, and will finally show how data structures 1517 are used to translate tmessages 1521 into file function calls 105 or 107 and to produce rmessages 1519. Protocol interpreter data structures 1517 are made up of four different kinds of elements:

Frspc 1601 contains the data received from a tmessage 1519;

Fid 1609 corresponds to file identifier 331 used by mount service 203(*a*) to identify a file in name space portion 1401 of name space 115(*a*) and contains the information needed to access the file;

File structure 1623 is used to map names from portion 1401 in name space 115(*a*) onto names for portion 1401 in name space 115(*b*); and Slave procedure structure 1635 represents one of slave procedures 1515.

Beginning with Frspc 1601, an array of such structures is allocated by INIT 1503. Each time RDLOOP 1505 of code 1409 is executed, a non-busy element of the array is located and the data in the tmessage 1521 which is read from protocol channel 1519 is placed in a non-busy element of the array. The element then remains busy until the rmessage 1519 corresponding to the tmessage 1521 is sent. There are three fields which are of interest in the present discussion: Busy 1603, which indicates whether Frspc 1601 is presently in use, WORK 1605, which indicates what kind of tmessage 1521 was received, and DATA 1607, which contains the data received in the tmessage 1521.

Next is Fid 1609. The fields are file descriptor (FD) 1611, which is a file descriptor 417 used by file system 109(*b*) to access a file in name space portion 1401. Offset (OFF) 1613 indicates a position in the file specified by file descriptor 1611. File structure pointer 1615 is a pointer to file structure 1623 representing the file specified by file descriptor 1611; mode 1617 indicates the mode of the file specified by file descriptor 1611; FID 1619 is the FID 331 used by mount service 203(*a*) to represent the file represented in file system 109(*b*) by file descriptor 16 11; NEXT 1621, finally, is a pointer to the next element in a chain of Fids 1609.

File structure 1623 has the following fields: NAME 1625 is the name of a file in name space portion 1401; Protocol qid (PQID) 1627 is a qid 323 which exportfs provides to file system 109(*a*) for use in file system 109(*a*)'s data structures; it is not the same as the qid 323 by which the file is known to file system 109(*b*). The three remaining fields, PARENT 1629, CHILD 1631, and Child list (CHLIST) 1633 are pointers to other file structures 1623; the use of these pointers will be explained in detail below.

Slave process structure 1635, finally, is an element in a linked list thereof. Each element represents one slave process 1515. The data structure has three fields: PID 1637, which is the process identifier of the slave process 1515 represented by the element, BUSY 1639, which indicates that the slave process 1515 represented by the element is currently in use, and NEXT 1641, which is a pointer to the next element in the linked list.

FIG. 17 shows how the data structures shown in FIG. 16 are used when exports is in operation. When a FID 331 is received from TM 1521, it is provided to hash function 1701, which responds to a FID 331 by providing a chain pointer 1703 to a chain 1705 of Fid data structures 1609. One of the Fid dam structures 1609 in chain 1705 is the data structure 1609 for the file represented by FID 331 and contains that FID 331 in FID field 1619. File structure pointer field 1615 from Fid data structure 1609 points to file structure 1623 for the file represented by FID 331.

File structures 1623 are organized into file tree 1707, which is a representation of the file tree in name space portion 1401 of name space 115(*b*). When file tree 1707 is complete, each file in name space portion 1401 is represented by a file structure 1623 and the file structure 1623 occupies the same place in file tree 1707 that the corresponding file occupies in the file tree of name space portion 1401. That is shown in FIG. 17 by the letters in the blocks 1623, which represent the names in NAME field 1625. The root block 1623 contains the complete pathname in name space 115(*b*) of the root directory of the file tree of name space portion 1401. Thus, in this case, the root contains the pathname /O/I. In a preferred embodiment, the root is created by initialization code 1503, which, after changing directories to the root of name space portion 1401, places the path name of the current directory into NAME field 1625 and makes a PQID for PQID 1627. The PQIDs for the root and for other nodes of file tree 1707 are generated in such fashion that each PQID is unique in file tree 1707. The tree is organized by means of the pointer fields 1629, 1631, and 1633 in file structure 1623. As shown in FIG. 17, field 1629 points to the parent, if any, of file structure 1623 in tree 1707, field 1631 points to the first child, if any, of file structure 1623 in tree 1707, and CHLIST 1633 points to the next sibling, if any, of file structure 1623 in tree 1707. Slave process structures 1635, finally, are organized into a chain of such structures 1709.

File Operations Performed by exports 1501

At the point at which process 102(*b*) begins executing read loop 1505, there are no Fid chains 1705 and file tree 1707 consists of a single file structure 1623, namely file structure 1623 for the root. Before name space portion 1401 can be used, an attach service file locator request must be performed. Since expert: #s 1501 is a protocol service 209, the first treessage 1521 received in exportfs 1505 is a tattach message specifying the attach operation. The important part of the tattach message for the present discussion is FID 331, which mount service 203(a) is using to identify the root of name space portion 1401. On receiving the tattach tmessage, readloop 1505 places the FID 331 in work field 1605 of an Fsrpc structure 1601. Code in non-blocking protocol interpreter 1509 then gets a Fid structure 1619 corresponding to the file which is the root of name space portion 1401. Getting the Fid structure involves providing the FID 331 from work field 1605 to hash function 1701 to locate the Fid chain in which the Fid structure 1609 for the FID 331 should be located. If the Fid structure 1609 is already in the Fid chain 1705, pointer 1615 will point to file structure 1623 which is the root of file tree 1707. Otherwise, the Fid structure must be added to the Fid chain. This is done by getting the Fid structure 1609 from a free list of the structures, and placing the Fid structure 1609 in the proper Fid chain 1705. When this is done, the FID 331 is placed in FID field 1619 and File Structure pointer 1615 is set to point to the root of file tree 1707. Next, FID 331 and the contents of PQID field 1627 in the root File structure are provided to reply 1513, which includes FID 331 as the FID and the contents of PQID field 331 as the qid 323 in the rattach message returned to mount service 203(a). As explained in the section "Overview of the Architecture of Plan 9 Services" above, a qid is a file handle provided by a service 123. An important aspect of exportfs 1501 is that it returns PQID 331, a synthesized qid 323, to mount service 203(a), rather than the qid 323 by which file system 109(b) knows the file. As will be explained in more detail later, provision is further made so that where necessary, the actual qid 323 for the file is provided to process 102(a).

Once a root directory has been attached, navigation is by walk function calls, which in the present case result in twalk tmessages. The twalk tmessage contains FID 331, which at this point represents the the current directory and a name which indicates either the parent of the current directory or one of the children of the current directory. The rwalk rmessage contains FID 331, which now represents the file that has been walked to, and the file's qid 323. If the root directory has been just attached, the current directory is of course the root directory. Presuming that the twalk tmessage specifies "J" as the name of the file, non-blocking protocol interpreter 1509 proceeds as follows: it uses FID 331 from the twalk message to locate Fid 1609 (in this case, the Fid 1609 for the root) and then follows file structure pointer 1615 to locate the corresponding file structure 1623, in this case, the file structure for the root of file tree 1707. At present, file tree 1707 consists only of the root; consequently, child pointer 1631 is set to "0". In this situation, a new file structure 1623 for the file "J" must be allocated and placed in the proper location in file tree 1707.

The first step is to check whether the file "J" exists as a child of the root directory. This is done by making a path name for "J". The path name is made by combining the name "J" with the names of all of the parents of "J" through the root of file tree 1707. Since the root of file tree 1707 contains the complete path name of the root directory for name space portion 1401, the result is the complete path name of the file "J", in this case, /O/I/J.

The complete path name is then used in a "dirstat" file system function call 105 to file system 109(b) to confirm that the file exists. Since the file "J" exists, the next step is to allocate a new file structure 1623. In the new file structure 1623, NAME 1625 is set to "J", a value is generated for PQID 1627, and PARENT 1629 is set to point to the root file structure 1623; in root file structure 1623, CHILD 1631 is set to point to the new file structure 1623. Once the new file structure 1623 has been added to file tree 1707, a pointer to the new file structure is placed in FSPTR field 1615 in Fid structure 1609 for FID 331 and reply 1513 returns FID 331 from the twalk message and PQID 1627 from the new file structure 1623 for the file "J" as the FID 331 and the qid 323 in the rwalk message. Of course, if there is already a file structure 1623 for the file in file tree 1707, all that is necessary is to provide PQID 1627 from that file structure 1623 as the qid 323 returned in the rwalk message. Similarly, if the file name is "..", indicating the parent of the present file, all that is necessary is to locate the file structure 1623 for the file represented by FID 331 in file tree 1707, follow parent pointer 1629 to the parent file structure 1623, and provide PQID 1627 from the parent as the qid 323 returned in the rwalk message.

The method used above to determine whether the file "J" exists in name space 115(b) is an example of the general technique used in exportfs 1501 to map a name from name space portion 1401 in name space 115(a) onto a name from name space portion 1401 in name space 115(b). The general technique is to use Fid structure 1609 for a file to locate the entry in file tree 1707 for the file, use file tree 1707 to generate the desired complete path name for the file in name space 115(b), and then use the complete path name in a file locator function call 107 to file system 109(b).

To create a file in name space portion 1401, process 102(a) uses the create function call, which results in mount service 203 sending a tcreate tmessage 1521 to exportfs 1501. The tcreate tmessage includes FID 331, which presently represents the directory which is to contain the new file, a name for the new file, the permissions for the new file, and the mode, namely what kind of operations are permitted on the new file. The rcreate rmessage will contain FID 331, which now represents the new file, and qid 323 for the new file.

After rdloop 1505 reads the tmessage, the information in the message is placed in work 1605 of a non-busy Fsrpc structure 1601, which is provided to nonblocking protocol interpreter 1509. The first step is to get Fid structure 1609 corresponding to FID 331 and to follow file structure pointer 1615 to file structure 1623 for the directory in which the new file is to be created. Next, the full path name for the new file is made using the name received in the tmessage and the names in file structure 1623 and its ancestors in file tree 1707. The full path name and the mode and permission information from the tcreate message are then used in a file system create function call to file system 109(b). The create call returns a file descriptor 417 for the new file, which is copied into file descriptor 1611 of Fid structure 1609 for FID 3331. Now that the new file has been created, it is necessary to make a new file structure 1623 for the file. In the new file structure 1623, the name received in the tcreate message is placed in NAME field 1625 and a new PQID for the file is synthesized and placed in PQID field 1627. Finally, the pointers in the new file structure 1623 for the file are set so that the new file structure 1623 goes to the head of the list of child file structures 1623 for file structure 1623 for the directory in which the file was created. The last steps are to place the pointer to the file structure 1623 for the new file in Fid 1609 for FID 331, to set the mode field 1619 in the Fid 1609 to the value received in the tcreate message, to set offset field 1615 to 0, and to provide FID 331 and PQID 1617 to reply 1513 to be returned in the rcreate message.

An open file call by process 102(a) to file system 109(a) results in a topen tmessage containing FID 331 for the file to be opened and a value specifying the mode in which it is to be opened. The ropen message contains HD 331 and a qid 323 for the opened file. The open file call will block the process 102 making it; consequently, process 102(*b*) obtains a slave process 1515 from slave process chain 1709 and passes Fsrpc 1601 made from the topen tmessage to the slave process 1515. The slave process then executes code in blocking protocol interpreter 1511 for the topen tmessage.

In the case of the open operation, the file to be opened has already been located by a walk file call or a create file call. Consequently, there should be a Fid structure 1609 for FID 331 which contains a file structure pointer 1615 to file structure 1623 for the file to be opened. When Fid structure 1609 and file structure 1623 for the file are located, the full path name for the file is made from the NAME fields 1625 in file structure 1623 for the file and its ancestors in file tree 1707 and then used in an open file call along with the mode from the topen treessage. The open file call returns a file descriptor 417 for the opened file, which is placed in FD field 1611 of Fid structure 1609 for FID 331. Mode field 1617 of that Fid structure 1609 is set to the value provided by the tmessage and offset field 1613 is set to 0. Reply 1513 returns FID 331 and PQID 1627 from file structure 1623 for the opened file in the ropen message. After reply 1513 has been executed, busy field 1639 in slave process structure 1635 for slave process 1515 is set to 0.

In the cases of the read and write file operations, these operations are performed on files which have already been located and opened. The read operation can serve as an example for both. The treessage for the read operation includes FID 331, an offset at which the reading is to begin, and a number of bytes to be read. The rmessage for the read operation includes FID 331, the number of bytes read, and the data read. When read loop 1505 receives the tread message, it obtains a slave process 1515 and passes it the Fsrpc structure 1601 containing the data from the tread message. Slave process 1515 executes read code in blocking protocol interpreter 1511. Since the file being read has already been located and opened, Fid 1609 corresponding to FID 331 received in the tmessage already has the file descriptor 417 for the file to be read in field 1611. If the value of offset field 1613 is not the same as the offset received in the tmessage the offset is moved to the location specified in the tmessage. Then the read file system call to file system 109(*b*) is used to read the file specified by FID 331 beginning at the locations specified by the offset in the tread message for the number of bytes specified in the tread message. When the read is complete, offset field 1613 in FID 331's Fid structure 1609 is set to the old offset plus the number of bytes read and reply returns FID 331, the count received in the tread message, and the data read in the rread message. Again, busy field 1639 in structure 1635 for the slave process 1515 is set to 0.

From the foregoing, and from the descriptions of the service file operations given in the "Overview of the Architecture of Plan 9 Services" above, it will be apparent to those of ordinary skill in the art how the remove, clone, and clunk operations are implemented in exportfs 1501. The slat operation, which reads the status of a file, are of somewhat more interest because of the roll of qid 323 in the operation. The tstat tmessage contains only the FID 331 for the file whose status is to be read; FID 331 is used to locate Fid structure 1609 for FID 331 and file structure pointer 16115 is used to locate file structure 1623 in tree 1707 for the file. Then the whole path name for the file specified by HD 331 is obtained from file tree 1607 and used in the stat file access function call, stat returns information including the qid 323 by which the file is known in file system 109(*b*). It is this qid 323, and not PQID 1627 from file structure 1623 for the file which is returned along with the other information received from the stat file acces function call in the rstat message.

The reason the actual qid 323 is required instead of PQID 1627 is that more than one name space portion 1401 may have been exported from name space 115(*b*) to name space 115(*a*), and if the same file is in both name space portions 1401, it will have a separate file structure 1623 for each name space portion 1401 and each of those file structures 1623 will have a different value in PQID 1627, even though both represent the same file in name space 115(*b*). Process 102(*a*) may attempt to determine whether the files (which will have different path names in name space 115(*a*)) are the same by comparing the qids 323 returned for the file by the stat function; consequently, the rstat rmessage must include the actual qid 323 for the file, not PQID 1627.

An important advantage of the data structures in protocol interpreter data structures 1517 is that they are dynamic. Fid structures 1609 are added to Fid chains 1705 only as mount server 203(*a*) uses FIDs 331 in tmessages, and are removed from Fid chains 1705 whenever a tmessage indicates that there is no longer an association between the FID 331 and a file in name space portion 1401. Similarly, a file structure 1623 is added to file tree 1707 only if there has been a twalk message or a tcreate message specifying the name of the file represented by the file structure.

Plan 9 System Calls employing exportfs

Two Plan 9 services 123 which employ exportfs are import and cpu. import uses exportfs to import a name space portion 1401 from a remote system. import takes as arguments the name of the remote system and the path name of the root directory for name space portion 1401 in the remote system. It may also take the path name of the directory in the local system upon which the file is to be mounted. Options permit the root directory to be mounted before, after, or in place of the directory it is being mounted on, as described in the "Overview of the Architecture of Plan 9 Service" section above.

import works as follows: first, it uses the dial system call to establish a protocol channel 517 to exportfs on the remote system. Then it provides the path name for the root directory to exportfs, which uses it to initialize file tree 1707 as just described. Then, when import receives the confirmation message from exportfs, it mounts the file descriptor 417 for the protocol channel 517 on the directory in name space 115(*a*) specified in the argument in the fashion specified in the options and exits. If no directory in name space 115(*a*) is specified, the directory in 115(*a*) which has the same path name as that specified for the directory in name space 115(*b*) is used as the mount point.

Discussion of the C CPU service 123 first requires a review of the environment in which Plan 9 processes typically execute. As shown in FIG. 7 and described in the section "Overview of the Plan 9 Operating System", a distributed system in which the Plan 9 operating system is used typically includes a number of CPU servers 703, file servers 705, and terminals 711. The CPU servers and file servers are connected by means of a high-speed DMA 709, and the terminals 711 are connected to the high-speed DMA 709 by a nationwide long-haul network 715. Plan 9 processes 102 may run at least on CPU servers 703 and terminals 711. A typical way of using the system is to do graphical user interface-intensive tasks such as editing on terminal 711 and compute-intensive tasks such as compilation on CPU server 703.

The CPU service 123 permits a user to shift from executing programs on terminal 711 to executing programs on CPU server 703. The program executing on CPU server 703 appears to the user of terminal 711 to be executing in a window on terminal 711, and the user can provide input to the program executing on CPU server 703 and receive output from the program via the window. A fundamental distinction between the CPU service and the terminal emulation programs generally used to execute programs on remote CPUs is that the name space of the process 102 on terminal 711 which executes the CPU service is exported to the process 102 which executes the program on CPU server 703. In terms of FIG. 14, system 2 1413 is terminal 711 and process 102(*b*) is the process executing the CPU service, while system 1 1411 is CPU server 703 and process 102(*a*) is the process executing the program for the user on CPU server 703.

The command which starts the C CPU service has two options, one of which specifies the CPU server 703 on which the program is to be executed, and the other of which specifies the program by means of a command line for re, the Plan 9 shell. If neither option is specified, a default CPU server 703 is provided and the program which is executed is vc. The CPU service has two parts, one of which executes on CPU server 703 and the other of which executes on terminal 711. Execution begins with the part that executes on terminal 711. In the following, it is presumed that that part is executed by a process 102(*i*). That part uses the name of CPU server 703 provided in the command or by default to determine the network address of CPU server 703 and then uses the dial system call to send a message to CPU server 703 which results in the establishment of a protocol channel 517 to CPU server 703. The terminal part of the service then writes first the command to be executed by CPU server 703 to protocol channel 517 and then either the suing "NO" or process 102(*i*)'s working directory to protocol channel 517.

In CPU server 703, the listener responds to the message from dial by starting a process 102(*j*) with the default name space 115(*j*) for the user on CPU server 703 and connecting standard input, standard output, and error for the process to protocol channel 517. Default name space 115(*j*) includes a directory term upon which a name space portion 1401 from process 102(*i*) may be mounted. The process then begins executing the part of CPU which executes on CPU server 703. That process then performs a first read on protocol channel 517 which gets the command and a second read which gets the directory, if any. If there is a directory, process 102(*j*) changes to that directory; otherwise, it changes to the home directory for the user of the process 102(*j*). The next step is to send the pid of process 102(*j*) via the channel to process 102(*i*) to confirm process 102(*j*)'s existence to process 102(*i*). Thereupon, process 102(*j*) first sends process 102(*i*) the string "FS", indicating that process 102(*i*) is to execute export files service code 1409, and then sends "/", indicating that process 102(*i*) is to export its entire name space 115(*i*).

In terminal 711, process 102(*i*) receives the "FS" suing and begins executing export files service code 1409, thus becoming exportfs 1501. exportfs 1501 reads the "/" sent by process 102(*j*) and uses it as already described to initialize protocol interpreter dam structures 1517. It then returns the string "OK"0 to process 102(*j*), which responds by mounting the file descriptor 417 for protocol channel 517 onto the directory term in name space 115(*j*), thereby incorporating the entire name space of process 102(*i*) into the name space of process 102(*j*). Henceforth, file operations on files in the directory term in process 102(*j*)'s name space 115(*j*) will result in operations on files in the name space 115(*i*) of process 102(*i*) on terminal 711.

Conclusion

The foregoing "Detailed Description" has disclosed the best mode presently known to the inventors for implementing their techniques for incorporating a portion of one name space into another name space. In the Plan 9 operating system in which they have implemented their techniques, name spaces are per-process; consequently, the name space from which the portion is exported belongs to a process, as does the name space to which the portion is imported. The techniques do not, however, require that the name spaces belong to processes, but may be employed whenever a portion of a name space defined by one entity is to be incorporated into a name space defined by another entity. Moreover, while the names in Plan 9 name spaces designate files, the techniques can be used with names designating any kinds of entities.

Further, while the name space being exported in the preferred embodiment belongs to a process running on a remote processor, the techniques can also be used to export a name space belonging to a process running on the same processor as the process to which the name space is being exported. Additionally, while the present implementation translates from Plan 9 file protocols to Plan 9 file system calls, the same techniques may be used to translate any operation which specifies a name in the portion as it appears in the importing name space into an operation which specifies the name as it appears in the exporting name space.

Still further, the techniques employed by the inventors to map the names as they appear in the importing name space into the names as they appear in the exporting name space take advantage of the fact that Plan 9 name spaces are organized as trees; with name spaces organized in other fashions, mapping techniques appropriate to those organizations can be used in the same fashion as the ones disclosed herein. Finally, it will be apparent to those of ordinary skill in the art that there are many ways of implementing the techniques disclosed herein other than the ones of the "Detailed Description."

The above being the case, the foregoing "Detailed Description" is to be regarded as being in all respects illustrative and exemplary, and not restrictive, and the scope of the inventions disclosed herein is to be determined solely by the following claims as interpreted in light of the Specification and according to the doctrine of equivalents.

What is claimed is:

1. Apparatus which is implemented in a computer system for making an exported name from a portion of a first name space of user-defined names representing entities available to be used in a portion of a second name space of user-delined names so that use of the exported name in the portion of the second name space results in use of the exported name in the portion of the first name space, the apparatus comprising:

mounting means operating in the second name space for incorporating the portion of the first name space into the second name space and thereby making the exported name available in the second name space;

means operating in the first name space for receiving a first operation specification produced in the second name space, the first operation specification specifying an operation and including the exported name, the exported name being used in the first operation specification as required for the portion in the second name space, the means for receiving operating after operation of the mounting means;

interpretation means operating in the first name space for responding to the first operation specification by producing a second operation specification which specifics the same operation and includes the exported name, the exported name being used in the second operation specification as required for the portion in the first name space; and means operating in the first name space and responsive to the second operation specification for performing the operation on the entity represented by the exported name.

2. The apparatus set forth in claim 1 wherein:

the means for receiving the first operation specification receives the first operation specification from a source entity which uses the second name space; and the apparatus further comprises reply means for receiving a result of the operation from the means responsive to the second operation specification and transmitting a result specification including the result to the source entity.

3. The apparatus set forth in claim 2 further comprising:

a process which is a component in the computer system, the process operating in the second name space and being used to implement the means for receiving, the interpretation means, and the reply means; and a channel for transferring the first operation specification and the result specification between the process and the source entity.

4. The apparatus set forth in claim 3 wherein:

the source entity is another process; and the first name space and the second name space are per-process name spaces.

5. The apparatus set forth in claim 1 wherein the computer system further comprises;

a central processing unit and a local processing unit; and the first name space, the means for receiving a first operation specification, the interpretation means, and the operation means are implemented in the local processing unit;

the second name space and the mounting means are implemented in the central processing unit; and the means for receiving a first operation specification receives the first operation specification from the central processing unit.

6. The apparatus set forth in claim 5 wherein:

the local processing unit includes a display and an input device;

there is a plurality of the exported names; and the exported names include names for the input device and the display.

7. The apparatus set forth in claim 5 wherein:

the first name space and the second name space belong to the same user of the local processing unit and the central processing unit.

8. The apparatus set forth in claim 1 wherein:

the first operation specification specifies one of a plurality of operations, the plurality of operations including a blocking operation, and the interpretation means responds to the first operation specification when the first operation specification specifies a blocking operation by obtaining a slave process in the computer system for the second operation specification; and the means responsive to the second operation specification performs the operation on the entity represented by the exported name for the slave process, whereby the interpretation means is free to respond to a further first operation specification while the operation on the entity represented by the exported name is being performed for the slave process.

9. The apparatus set forth in claim 1 wherein the interpretation means includes:

mapping means for mapping the exported name into the second namespace.

10. The apparatus set forth in claim 9 wherein the means for receiving a first operation specification receives a plurality of operation specifications; and the mapping means is dynamically constructed in response to certain ones of the received first operation specifications and includes at least means for determining from the exported name how the exported name is to be used in the second operation specification.

11. The apparatus set forth in claim 10 wherein the mapping means comprises:

a dynamically-constructed tree with nodes for names in the first name space, the nodes being arranged such that determining how the exported name is to be used is done by locating the node for the exported name in the tree and traversing the tree from that node to the tree's root.

12. The apparatus set forth in claim 10 wherein:

the mapping means further maps the exported name onto an entity handle which uniquely identifies the entity represented by the exported name in the portion of the second name space but is different from a entity handle employed for the entity in the means for performing the operation, whereby the exported name can be exported to more than one namespace.

13. The apparatus set forth in claim 12 wherein:

the means for receiving the first operation specification receives the first operation specification from a source entity which uses the second name space;

the apparatus further comprises means for receiving a result of the operation from the means for performing the operation and transmitting a result specification including the result to the source entity;

the first operation specification specifies a status operation for determining a status of an entity represented by the exported name; and the result specification for the status operation returns the entity handle employed for the entity in the means for performing the operation.

14. A distributed computing system comprising:

a first process which has a first name space of user-defined names representing entities;

a second process which has a second name space of user-defined names;

a channel for transferring messages between the first process and the second process;

means in the first process for associating a portion of the second name space with the channel and binding the channel to a name in the first name space, whereby the names in the portion are exported to the first name space and become available therein;

means in the first process for sending a tint message via the channel which specifies an operation on an entity indicated by one of the exported names, the exported name being used in message as required in the first name space; and interpretation means in the second process for responding to the first message by producing a first operation specification which specifies the same operation, includes the exported name, and in which the exported name is used as required for the portion of the second name space; and operation execution means accessed by the second process and responsive to the first operation specification for performing the operation on an entity represented by the exported name.

15. The distributed computing system set forth in claim 14 further comprising:

reply means in the second process for receiving it result of the operation from the operation execution means and transmitting a second message containing the result to the first process.

16. The distribute computing system set forth in claim 15 wherein:

the means for sending the message sends the first message in response to a second operation specification which includes the exported name, the exported name being used in the second operation specification as required for the portion of the second name space, and responds to the second message by providing the result contained therein as the result of the operation specified by the second operation specification.

17. The distributed computing system set forth in claim 14 wherein:

the first and second name spaces are per-process name spaces.

18. The distributed computing system set forth in claim 14 further comprising:

a central processing unit, a local processing unit, and communications means connecting the central processing unit and the local processing unit; and wherein the first process executes on the central processing unit, the second process executes on the local processing unit, and the channel operates across the communications means.

19. The distributed computing system set forth in claim 18 wherein:

the local processing unit includes a display and an input device; and the identical names include names for the input device and the display.

20. The distributed computing system set forth in claim 14 wherein:

the first process and the second process belong to the same user.

21. A method employed in a computer system of making an exported name from a portion of a first name space of user-defined names representing entities in the computer system available in a portion of a second name space of user-defined names, the method comprising the steps of:

mounting the portion into the second name space, the exported name thereby becoming available in the second name space;

receiving a first operation specification in the first name space which specifies an operation and includes the exported name from a source entity of the computer system which operates in the second name space, the exported name being used in the first operation specification as required in the second name space;

responding to the first operation specification in the first name space by producing a second operation specification which specifies the same operation and includes the exported name, the exported name being used in the second operation specification as required for the first name space; and performing the operation specified in the second operation specification on the entity represented by the exported name, in the first name space.

22. The method set forth in claim 21 further comprising the steps of:

obtaining a result of the operation and transmitting a result specification including the result to the source entity.

23. A method employed in a computer system whereby a first entity having a first name space of user-defined names representing entities in the computer system cooperates with a second entity having a second name space of user-defined names in executing a first program, the method comprising the steps of:

in the first entity,
sending a first command specifying the first program to the second entity;

in the second entity,
responding to the first command by sending a second command to the first entity which specifies that the first entity execute a second program which, when executed, makes names from a first portion of the first name space available to the second entity as exported names in a second portion of the second name space;

in the first entity,
responding to the second command by executing the second program, exported names received from the second entity being thereby interpreted as names in the first portion of the first name space;

in the second entity,
incorporating the portion into the second name space; and executing the first program in the second name space.

* * * * *